(12) United States Patent
Chiba et al.

(10) Patent No.: US 11,052,887 B2
(45) Date of Patent: Jul. 6, 2021

(54) ELECTRIC COMPONENT ASSEMBLY, AND BRAKE FLUID PRESSURE CONTROL DEVICE FOR VEHICLE

(71) Applicants: NISSIN KOGYO CO., LTD., Tomi (JP); Veoneer Nissin Brake Systems Japan CO., LTD., Yokohama (JP)

(72) Inventors: Kentaro Chiba, Tomi (JP); Takaaki Komaba, Yokohama (JP)

(73) Assignees: Nissin Kogyo Co., Ltd., Nagano (JP); Veoneer Nissin Brake Systems Japan Co., Ltd., Kanagawa (JP)

( * ) Notice: Subject to any disclaimer, the term of this patent is extended or adjusted under 35 U.S.C. 154(b) by 39 days.

(21) Appl. No.: 16/486,751

(22) PCT Filed: Feb. 16, 2018

(86) PCT No.: PCT/JP2018/005540
§ 371 (c)(1),
(2) Date: Aug. 16, 2019

(87) PCT Pub. No.: WO2018/151266
PCT Pub. Date: Aug. 23, 2018

(65) Prior Publication Data
US 2019/0359193 A1 Nov. 28, 2019

(30) Foreign Application Priority Data
Feb. 17, 2017 (JP) .............................. JP2017-028533

(51) Int. Cl.
*B60T 8/36* (2006.01)
*H01F 27/28* (2006.01)

(52) U.S. Cl.
CPC ............ *B60T 8/36* (2013.01); *H01F 27/2828* (2013.01)

(58) Field of Classification Search
CPC ...................................................... B60T 8/3675
(Continued)

(56) References Cited

U.S. PATENT DOCUMENTS

| 5,513,905 A * | 5/1996 | Zeides ................ B60R 16/0239 |
| | | 303/113.1 |
| 5,679,009 A | 10/1997 | Okumura et al. |

(Continued)

FOREIGN PATENT DOCUMENTS

| DE | 4431108 C2 * | 12/2001 | ............ B60T 8/3675 |
| EP | 2707885 B1 * | 9/2018 | ............... H01F 7/06 |

(Continued)

OTHER PUBLICATIONS

EPO machine translation of DE 4431108 C2. (Year: 2001).*

(Continued)

*Primary Examiner* — Thomas J Williams
(74) *Attorney, Agent, or Firm* — Carrier Blackman & Associates, P.C.; William D. Blackman; Joseph P. Carrier

(57) ABSTRACT

An electric component assembly includes a housing with which an electric component is fitted, and the electric component and the housing are fixed to one surface of a base body. The electric component includes a connection terminal press-fitted to a through-hole (201a) of a board provided in the housing, and an insertion direction of the connection terminal into the through-hole is a fitting direction of the electric component with the housing. The electric component assembly includes a rib which is protrudingly provided on either one of an outer surface of the electric component intersecting the fitting direction and an inner surface of the housing facing the outer surface, and a groove portion which is provided as a recess on another one of the surfaces and the rib is inserted into; and a protrusion that abuts onto the rib is provided on an inner surface of the groove portion.

17 Claims, 21 Drawing Sheets

(58) Field of Classification Search
USPC .............................. 303/119.2, 119.3, DIG. 10
See application file for complete search history.

(56) References Cited

U.S. PATENT DOCUMENTS

| | | | | |
|---|---|---|---|---|
| 5,704,587 | A * | 1/1998 | Kuromitsu | B60T 8/363 |
| | | | | 251/129.15 |
| 6,086,043 | A * | 7/2000 | Hoffelder | B60T 8/3675 |
| | | | | 137/884 |
| 8,220,878 | B2 * | 7/2012 | Yoshinaga | B60T 8/368 |
| | | | | 303/119.3 |
| 8,534,641 | B2 * | 9/2013 | Schalowski | H01R 12/58 |
| | | | | 251/129.15 |
| 9,062,791 | B2 * | 6/2015 | Nakamura | B60T 8/3675 |
| 10,940,848 | B2 * | 3/2021 | Chiba | H01F 5/04 |
| 2008/0017174 | A1 * | 1/2008 | Kafer | H05K 7/20854 |
| | | | | 123/479 |
| 2019/0381984 | A1 * | 12/2019 | Chiba | H01F 5/04 |
| 2020/0055508 | A1 * | 2/2020 | Chiba | F16K 31/047 |

FOREIGN PATENT DOCUMENTS

| | | |
|---|---|---|
| JP | H08-88058 A | 4/1996 |
| JP | 2002-042935 A | 2/2002 |
| JP | 2006-342863 A | 12/2006 |
| JP | 5261223 B2 | 8/2013 |

OTHER PUBLICATIONS

PCT/ISA/210 from International Application PCT/JP2018/005540 with the English translation thereof.
PCT/ISA/237 (Written Opinion) from International Application PCT/JP2018/005540.

* cited by examiner

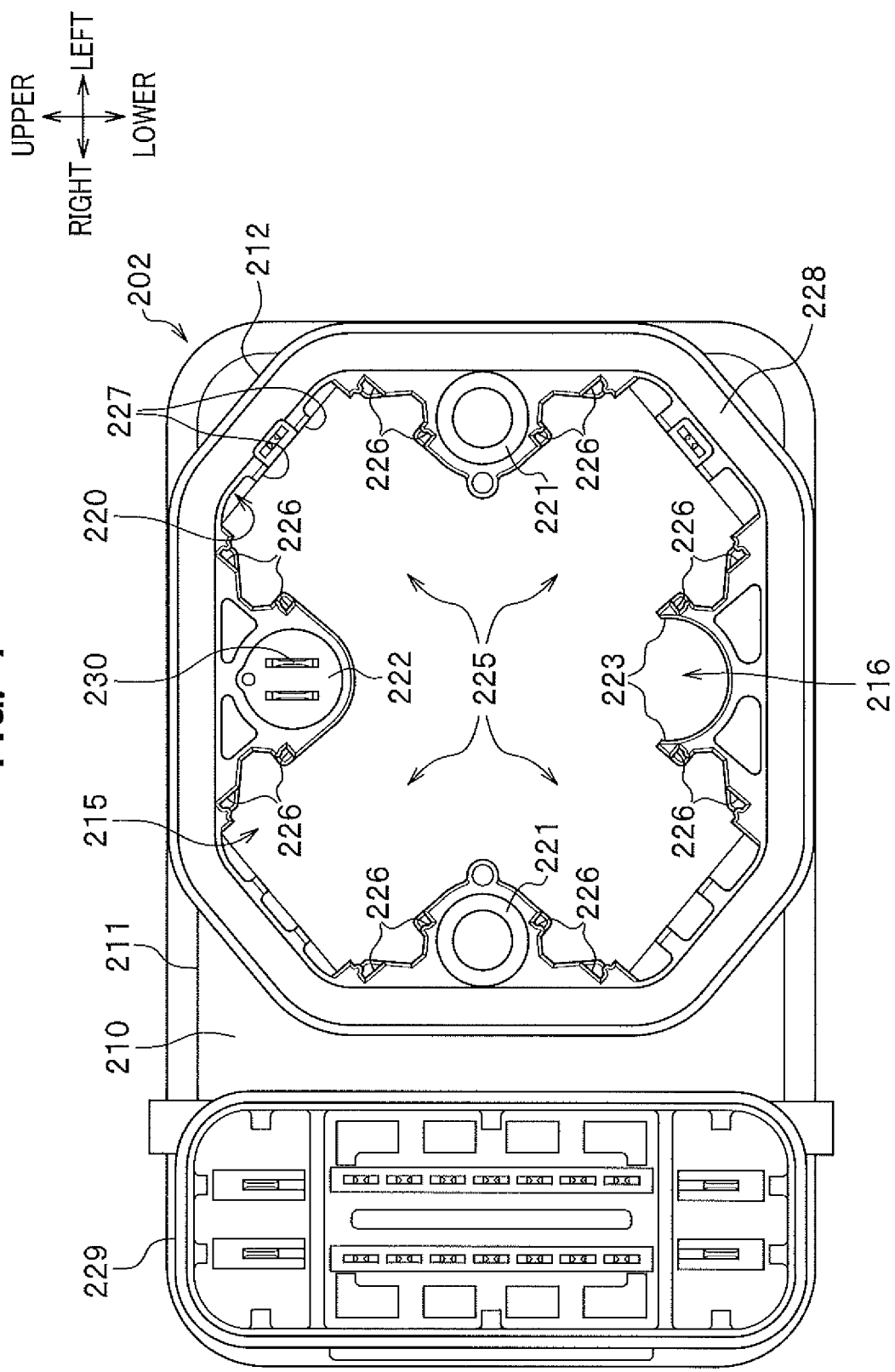

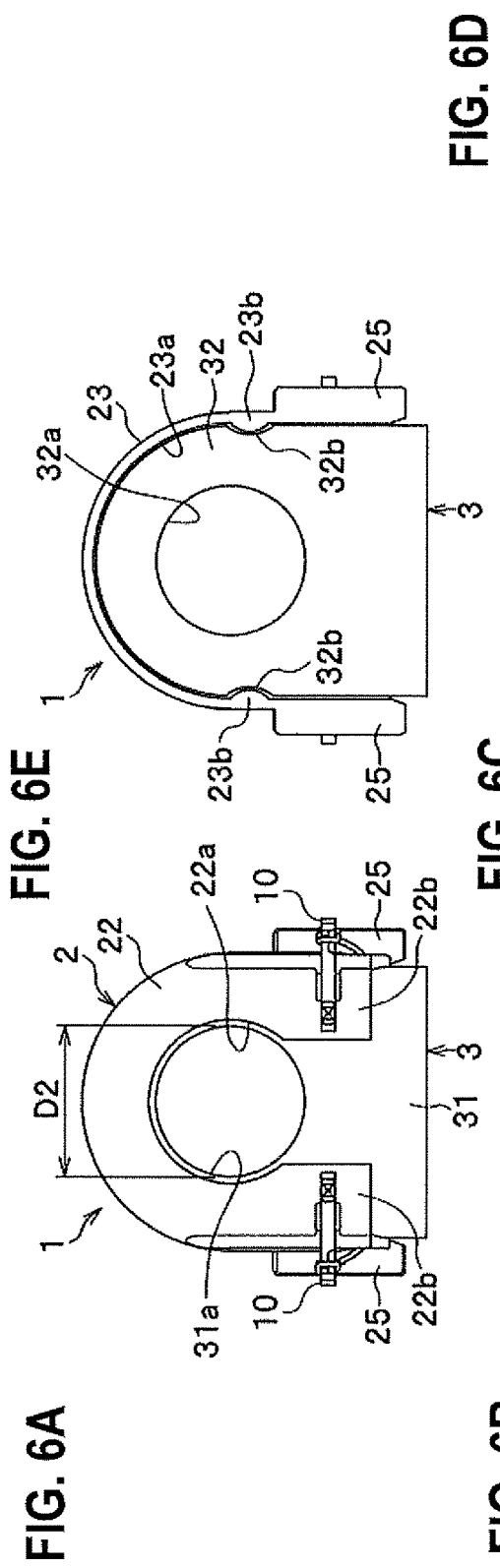
FIG. 6A
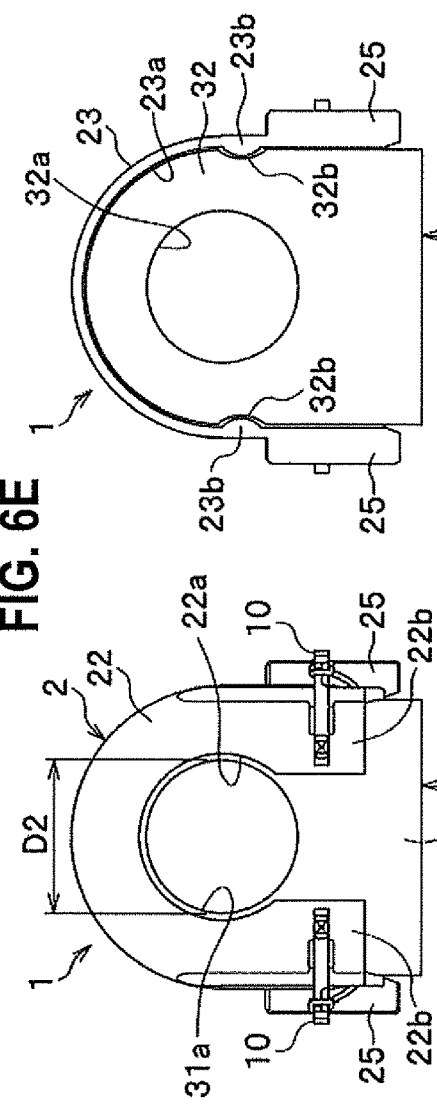
FIG. 6B
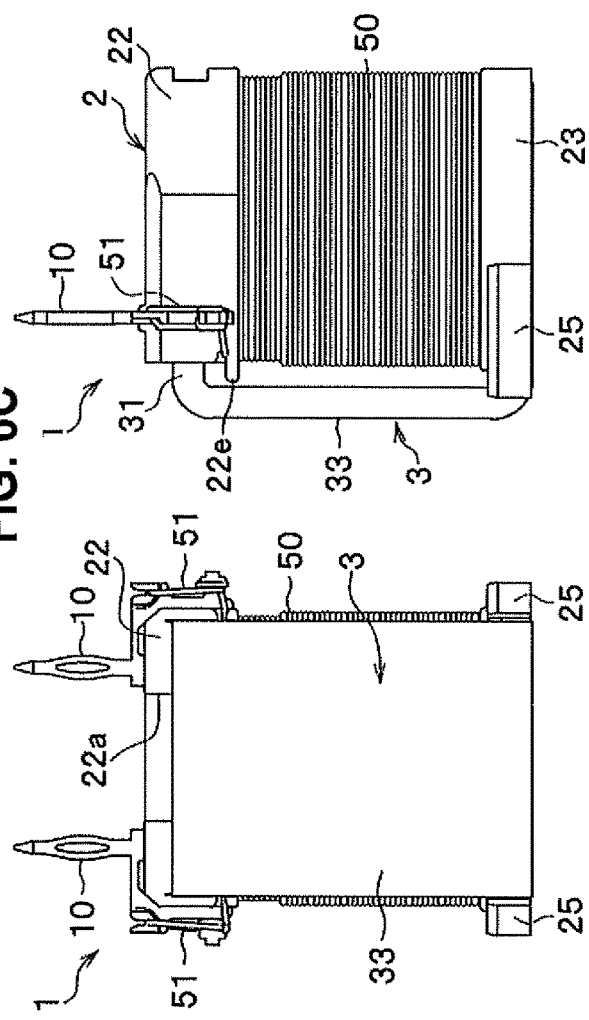
FIG. 6C
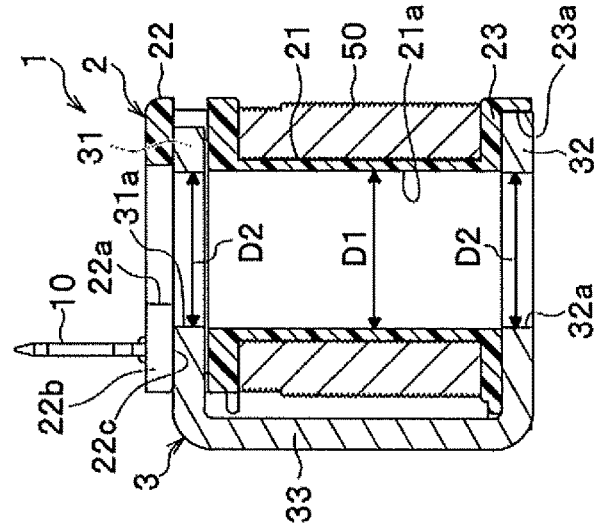
FIG. 6D
FIG. 6E

ELECTRIC COMPONENT ASSEMBLY, AND BRAKE FLUID PRESSURE CONTROL DEVICE FOR VEHICLE

TECHNICAL FIELD

The present invention relates to an electric component assembly and a vehicle brake fluid pressure control device.

BACKGROUND ART

A conventional brake system of some vehicles such as a two-wheeled vehicle or a four-wheeled vehicle is known to be provided with a vehicle brake fluid pressure control device for controlling the brake fluid pressure applied to wheel brakes. Such a vehicle brake fluid pressure control device includes a base body in which a brake fluid passage is formed, and a solenoid valve attached to a surface of the base body. The surface of the base body has attached thereto an electric component assembly including a coil assembly as an electric component mounted on the solenoid valve and a housing covering the coil assembly. The coil assembly is connected to a control board disposed within the housing.

The above-described vehicle brake fluid pressure control device controls energization of the coil assemblies to open and close the solenoid valve, and thereby the brake fluid pressure in the brake fluid passage is varied to control the braking force of the wheel brake.

The coil assembly includes a yoke, a bobbin disposed in the yoke, and a coil wound around the bobbin.

As a connection terminal connected to the coil, for example, one provided with a press-fit terminal as shown in PTL (Patent Literature) 1 is known. The coil assemblies and the control board are electrically connected by press-fitting and insertion-mounting the press-fit terminals into the insertion-mounting holes of the control board.

In addition, a structure in which an electric component such as a coil assembly is fixed to a housing only by connection using a press-fit terminal or the like is also being studied in order to simplify the fitting structure.

CITATION LIST

Patent Literature

PTL 1: Japanese Patent No. 5261223

SUMMARY OF INVENTION

Technical Problem

However, the following problem might be caused in the structure in which electric component such as coil assembly is fixed to the housing only through the connection with the connection terminals such as press-fit terminal. For example, if an excessive external force acts on the press-fit terminal in the connection direction thereof, the terminal part press-fitted and insertion-mounted on the control board might be deformed to make the coil assemblies or the like drop off the control board.

The present invention solves the problems described above by providing an electric component assembly and a vehicle brake fluid pressure control device which can suitably prevent the dropout of the electric component while adopting a simple connection structure to the control board with the connection terminals.

Solution to Problem

In order to solve the above problems, the present invention provides an electric component assembly, comprising: an electric component; and a housing in which the electric component is incorporated, wherein the electric component and the housing are fixed to one surface of a base body. The electric component includes a connection terminal that is press-fitted and insertion-mounted into a through-hole of a board provided in the housing, and an insertion direction of the connection terminal into the through-hole is the same as a fitting direction of the electric component to the housing. The electric component assembly includes a rib which is protrudingly provided on either one of an outer surface of the electric component intersecting the fitting direction and an inner surface of the housing facing the outer surface, and a groove portion which is provided as a recess on the other surface of the outer surface of the electric component and the inner surface of the housing and the rib is inserted into; and an inner surface of the groove portion is provided with a protrusion that abuts onto the rib.

In the electric component assembly of the present invention, the electric component may be positioned in the housing by inserting the rib into the groove portion and making the rib abut onto the protrusion. Thereby, in the electric component assembly according to the present invention, the dropout of the electric component can be suitably prevented while adopting a simple connection structure of the electronic component to the control board with the connection terminals.

In the electric component assembly, the protrusion preferably protrudes on the inner surface of the groove portion. This configuration allows the rib to abut onto the protrusion and thereby to be press-fitted into the groove portion. This enables the electric component to be fixed to the housing, and the connection terminal to be accurately disposed at the predetermined positions of the housing. Therefore, the position setting of the connection terminals is made easy, and the connection terminal can be easily connected to the control board.

In the electric component assembly described above, the connection terminal is preferably a press-fit terminal that can be more easily connected to the control board.

In the electric component assembly described above, the electric component is a coil assembly configured to drive a solenoid valve. The coil assembly preferrably includes a bobbin; a coil including a winding around the bobbin; a yoke attached to the bobbin; and the connection terminal electrically connected to the winding.

The present invention provides a vehicle brake fluid pressure control device, the device comprising the electric component assembly described above, being connected between a master cylinder and a wheel brake, and controlling a brake fluid pressure acting on the wheel brake. The vehicle brake fluid pressure control device has the solenoid valve attached to the base body and the coil assembly mounted on the solenoid valve.

In the vehicle brake fluid pressure control device of the present invention, the electric component can be fixed at a predetermined position of the housing, and the connection terminal can be accurately disposed at the predetermined position. Therefore, assemblability can be improved to reduce costs.

Advantageous Effects of Invention

The electric component assembly and the vehicle brake fluid pressure control device according to the present invention suitably prevents the dropout of the electric component while adopting a simple connection structure of the electric component to the control board with the connection terminal.

BRIEF DESCRIPTION OF DRAWINGS

FIG. 4 is a rear view of a housing which is a component of the electric component assembly of the first embodiment.

FIG. 5A shows a perspective view seen from the side where the yoke is disposed, and FIG. 5B shows an enlarged perspective view showing a press-fit terminal portion.

FIGS. 6A to 6E are views showing the coil assembly when the side on which a yoke is disposed is regarded as the rear surface, where FIG. 6A shows a plan view, FIG. 6B shows a rear view, FIG. 6C shows a right-side view, FIG. 6D shows a longitudinal sectional view, and FIG. 6E shows a bottom view.

FIG. 7A shows a front view, FIG. 7B shows a left side view, FIG. 7C shows a rear view, and FIG. 7D shows an enlarged rear view of the main portion.

FIG. 8A shows a partial perspective view showing a state when the coil assembly is being incorporated to the housing, and FIG. 8B shows a partial perspective view showing a state after the fitting.

FIGS. 16A, and 16B are views showing a coil assembly of the second embodiment, wherein FIG. 16A shows a perspective view seen from the side where the yoke is disposed, and FIG. 16B shows an enlarged perspective view showing a press-fit terminal portion.

FIG. 17A is a front view, FIG. 17B is a left side view, and FIG. 17C is a rear view.

FIG. 18A is a partial perspective view showing a state when the coil assembly is being incorporated to the housing, and FIG. 18B is a partial perspective view showing a state after the fitting.

DESCRIPTION OF EMBODIMENTS

Figure 3:
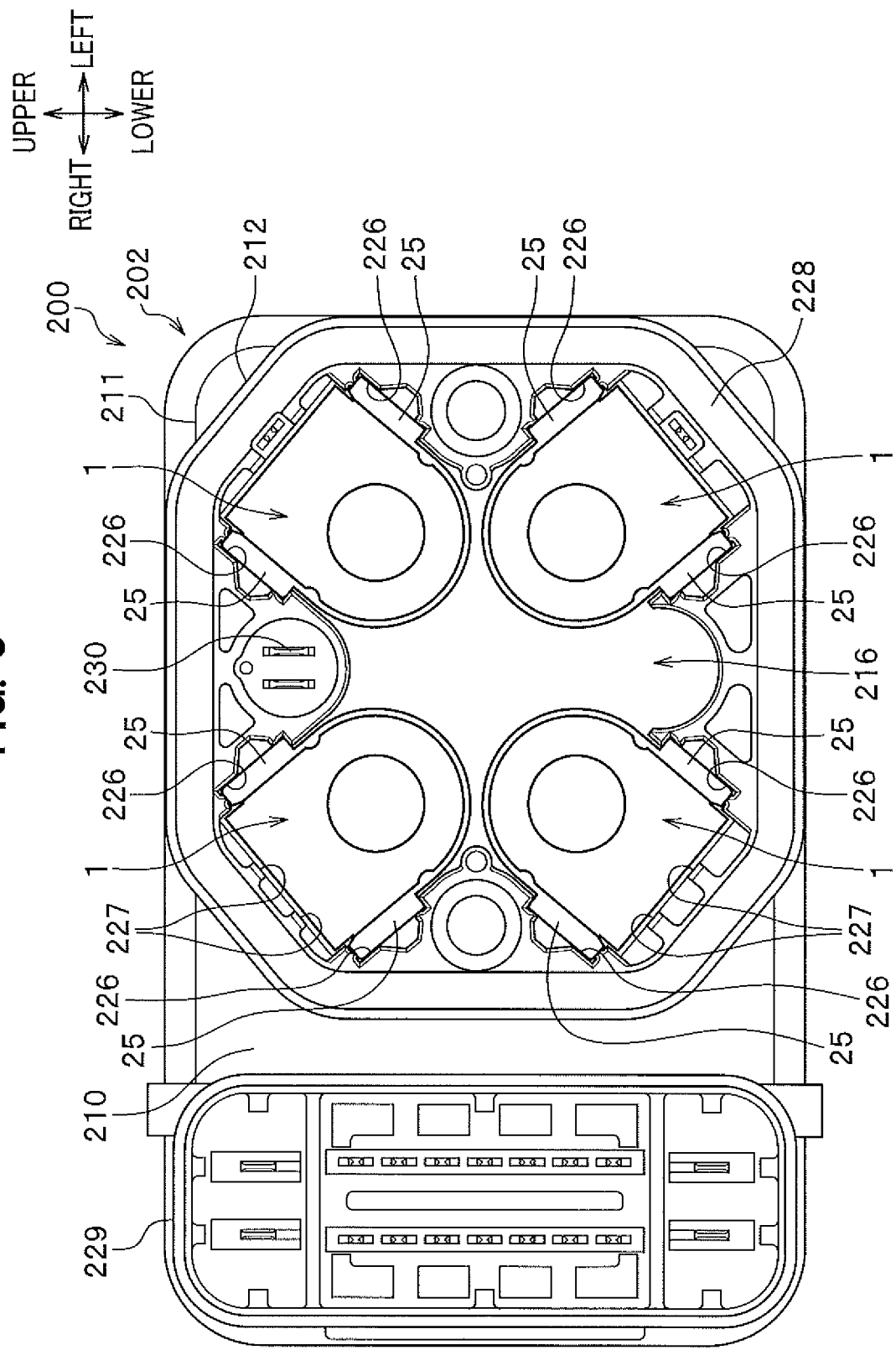
FIG. 3 is a rear view of the electric component assembly of the first embodiment.

Hereinafter, embodiments of the present invention are described in detail with reference to the drawings as appropriate. In the following description, front/rear/upward (upper)/downward (lower) of a vehicle brake fluid pressure control device are referenced to the directions shown in FIG. 1, and right-left thereof are referenced to the directions shown in FIG. 3 and FIG. 4 are set as a basis. Moreover, front/rear/right-left/upward (upper)/downward (lower) directions of the coil assembly that is an electric component are referenced to the directions shown in FIG. 5A, the purpose of which, however, is not to limit the fitting direction of the coil assembly to the vehicle brake fluid pressure control device.

First Embodiment

In this embodiment, a description is given as an example of a case that the electric component assembly of the present invention is applied to a vehicle brake fluid pressure control device for a two-wheeled vehicle provided with two brake systems. Of course, the present invention may be applied to a vehicle brake fluid pressure control device for a four-wheeled vehicle.

<Configuration of Vehicle Brake Fluid Pressure Control Device>

A vehicle brake fluid pressure control device U is connected between a master cylinder (not shown) and a wheel brake (not shown), and controls the brake fluid pressure acting on the wheel brake.

Figure 1:
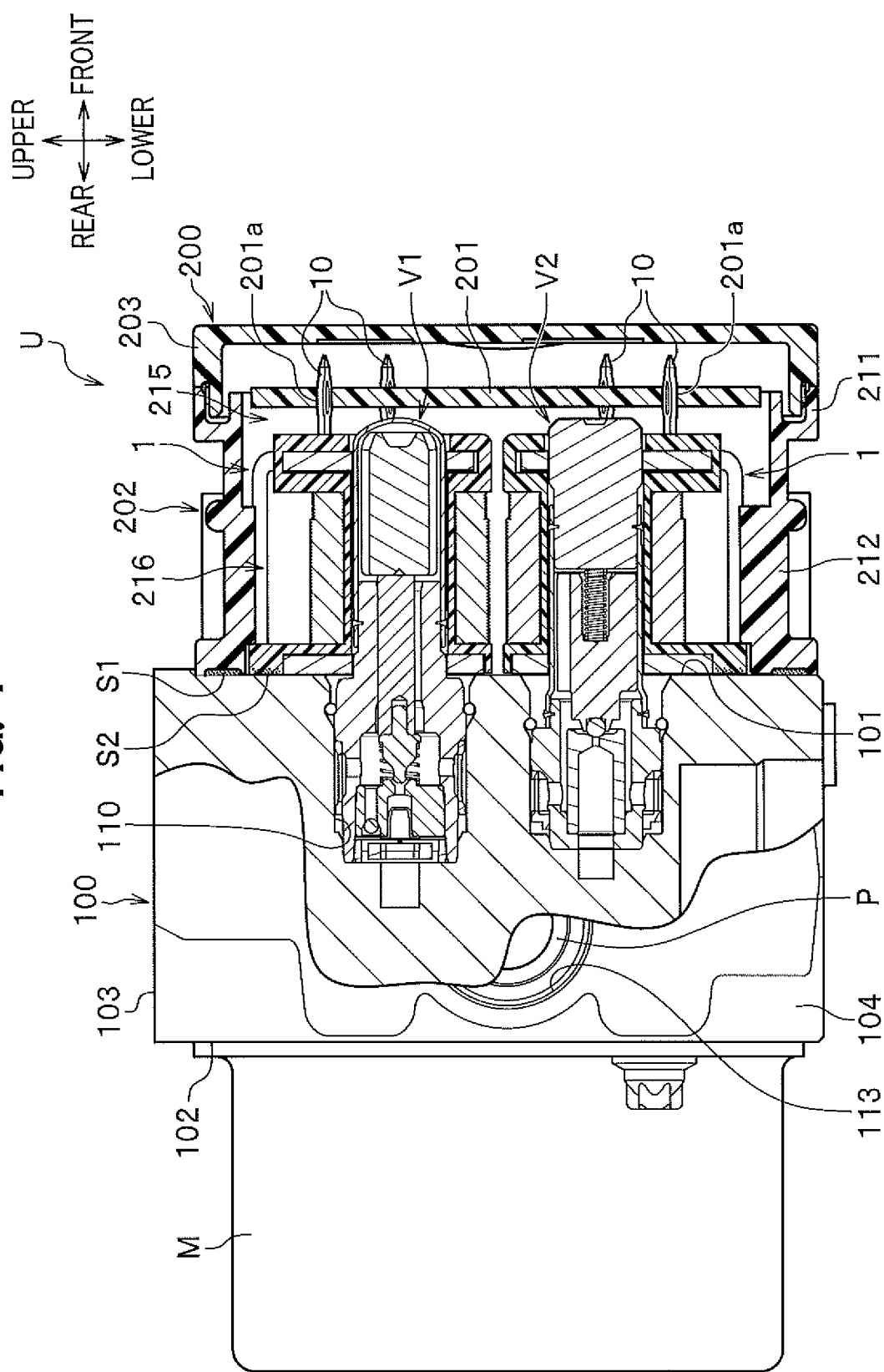
FIG. 1 is a side sectional view of a vehicle brake fluid pressure control device provided with an electric component assembly according to a first embodiment of the present invention.
Figure 2:
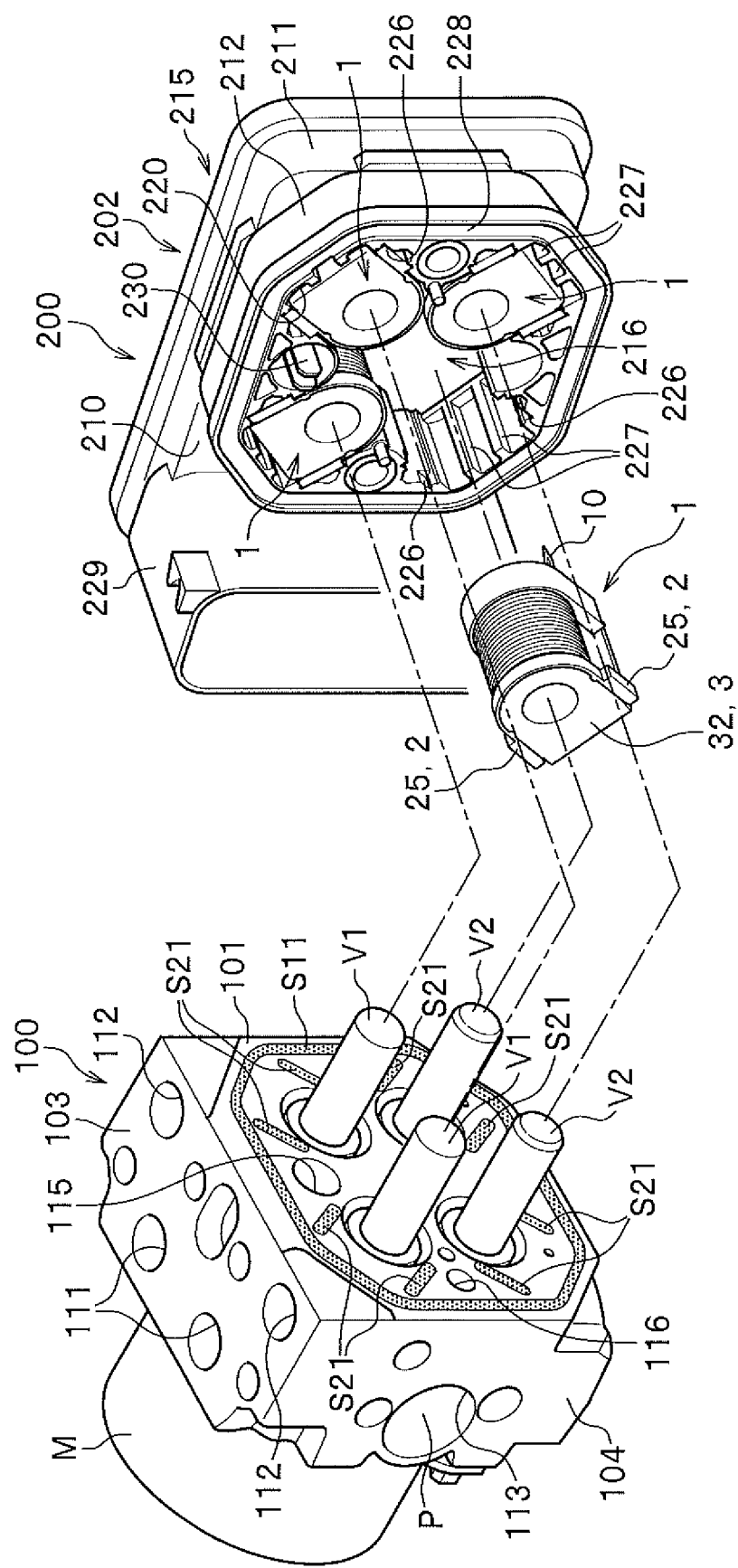
FIG. 2 is an exploded perspective view of the vehicle brake fluid pressure control device according to the first embodiment of the present invention.

As shown in FIGS. 1 and 2, the vehicle brake fluid pressure control device U includes a base body 100 in which solenoid valves V1 and V2 for two brake systems, a motor M, a reciprocating pump P, and other elements are fitted. The vehicle brake fluid pressure control device U includes an electronic control unit 200 as an electric component assembly provided with a control board 201 as an electric component that detects a motion of a vehicle body to control opening and closing of the solenoid valves V1 and V2 and operation of the motor M. The base body 100 may be fitted with various sensors such as a pressure sensor in addition to the solenoid valves V1 and V2.

The base body 100 is formed with a brake fluid passage (an oil passage), which is not shown. The vehicle brake fluid pressure control device U is configured to change the brake fluid pressure in the brake fluid passage by making the control board 201 operate the solenoid valves V1 and V2 and the motor M based on the behavior of the vehicle body.

<Configuration of Base Body>

The base body 100 is a metal component formed in a substantially rectangular parallelepiped (see FIG. 2), and formed with a brake fluid passage (oil passage), which passage is not shown in the figures.

A front surface 101 that is one of surfaces of the base body 100 has a plurality of bottomed mounting holes 110 and the like formed, into which holes 110 the solenoid valves V1 and V2 are mounted. Note that the number of solenoid valves V1 and V2 used varies depending on, for example, a type of the target vehicle such as four-wheeled or two-wheeled, and a difference in function of the vehicle brake fluid pressure control device U, and the like. Each of the solenoid valves V1 and V2 of the present embodiment is fitted therein with a coil assembly 1 as an electric component. The solenoid valve V1 is, for example, a normally open solenoid valve. The solenoid valve V2 is, for example, a normally closed solenoid valve. Each coil assembly 1 is electrically connected to the control board 201 using a press-fit terminal 10 as described below.

As shown in FIG. 2, an upper surface 103 of the base body 100 has inlet ports 111, outlet ports 112 to which pipes leading to a wheel brake (not shown) are connected, and the like formed.

Further, a lower surface of the base body 100 has a reservoir hole into which some of reservoir components (not shown) making up a reservoir are fitted, and the like formed.

Furthermore, a side surface 104 of the base body 100 is formed with a pump hole 113, in which the reciprocating pump P is fitted, and the like.

Note that holes provided in the base body 100 communicate with each other directly or through the brake fluid passages (not shown) formed inside the base body 100.

<Configuration of Motor>

The motor M is an electrically-driven component that is a power source for the reciprocating pump P. The motor M is integrally fixed to a rear surface 102 that is other surface of the base body 100. The motor M drives the reciprocating pump P.

The motor M is connected to a motor bus bar (not shown) for supplying power to a rotor. The motor bus bar is inserted into a terminal hole 115 (see FIG. 2) of the base body 100 and electrically connected through a bus bar terminal portion 230 (see FIGS. 2 and 4) of the electronic control unit 200 to the control board 201 (see FIG. 1, the same applies hereinafter). Press-fit terminals (not shown) are connected to the bus bar terminal portion 230 in a manner of protruding toward the front side. The motor bus bar connected to the bus bar terminal portion 230 is electrically connected to the control board 201 via the press-fit terminals.

<Configuration of Electronic Control Unit>

The electronic control unit 200 includes the coil assemblies 1, the control board 201, a housing 202, and a lid 203. The coil assemblies 1 are fixed by insertion to the housing 202 as described below. The housing 202 accommodates the coil assemblies 1 and the control board 201, as well as the solenoid valves V1 and V2, and the motor bus bar (not shown) protruding from the base body 100. Details of the mounting structure of the coil assemblies 1 to the housing 202 is described below.

The control board 201 includes a substantially rectangular board on which an electric circuit is printed and electronic components such as a semiconductor chip mounted. The control board 201 is formed with a plurality of through-holes 201a into which the press-fit terminals 10 provided in the coil assembly 1 are press-fitted. The control board 201 performs control based on information obtained from sensors and the like (not shown) provided in the vehicle and a program stored in advance. Specifically, the control board 201 regulates energization of the coil assemblies 1 (see FIG. 2) and the motor M to control the opening and closing operations of the solenoid valves V1 and V2 and the driving operation of the motor M. The sensors include various sensors, such as an angular velocity sensor, an acceleration sensor, and the like, as well as the pressure sensors.

<Configuration of Housing>

The housing 202 is a box integrally fixed to the front surface 101 of the base body 100 while covering the solenoid valves V1 and V2, and the like protruding from the front surface 101 of the base body 100 as shown in FIG. 1. The housing 202 is integrally formed from plastic material. The housing 202 is fitted with the control board 201 and the coil assemblies 1.

The housing 202 is open respectively at a front surface far from the base body 100 and a rear surface near the base body 100.

The housing 202 includes a plate-like bottom portion 210, a first peripheral wall portion 211 provided on a front surface of the bottom portion 210, and a second peripheral wall portion 212 provided on a rear surface of the bottom portion 210, as shown in FIG. 2.

The bottom portion 210 has a substantially rectangular outer shape. The first peripheral wall portion 211 extends forward from the periphery of the bottom portion 210, and is substantially rectangular in its outer peripheral shape. The first peripheral wall portion 211 defines a first accommodation chamber 215 (see FIG. 1) in which the substantially rectangular control board 201 is accommodated.

The second peripheral wall portion 212 extends rearward from the rear surface of the bottom portion 210, and is generally octagonal in its outer peripheral shape. The second peripheral wall portion 212 defines a second accommodation chamber 216 (see FIG. 1) in which the coil assemblies 1 are accommodated.

The first accommodation chamber 215 and the second accommodation chamber 216 communicate with each other as shown in FIGS. 1 and 3. It means that no partition walls are present between the first accommodation chamber 215 and the second accommodation chamber 216. The housing 202 is structured to have no partitions as described above to allow the coil assemblies 1 to be disposed extending from the second accommodation chamber 216 through to the first accommodation chamber 215 as shown in FIG. 1. This allows the housing 202 to suitably accommodate the coil assemblies 1 while being downsized in the front-rear direction.

Figure 8A:
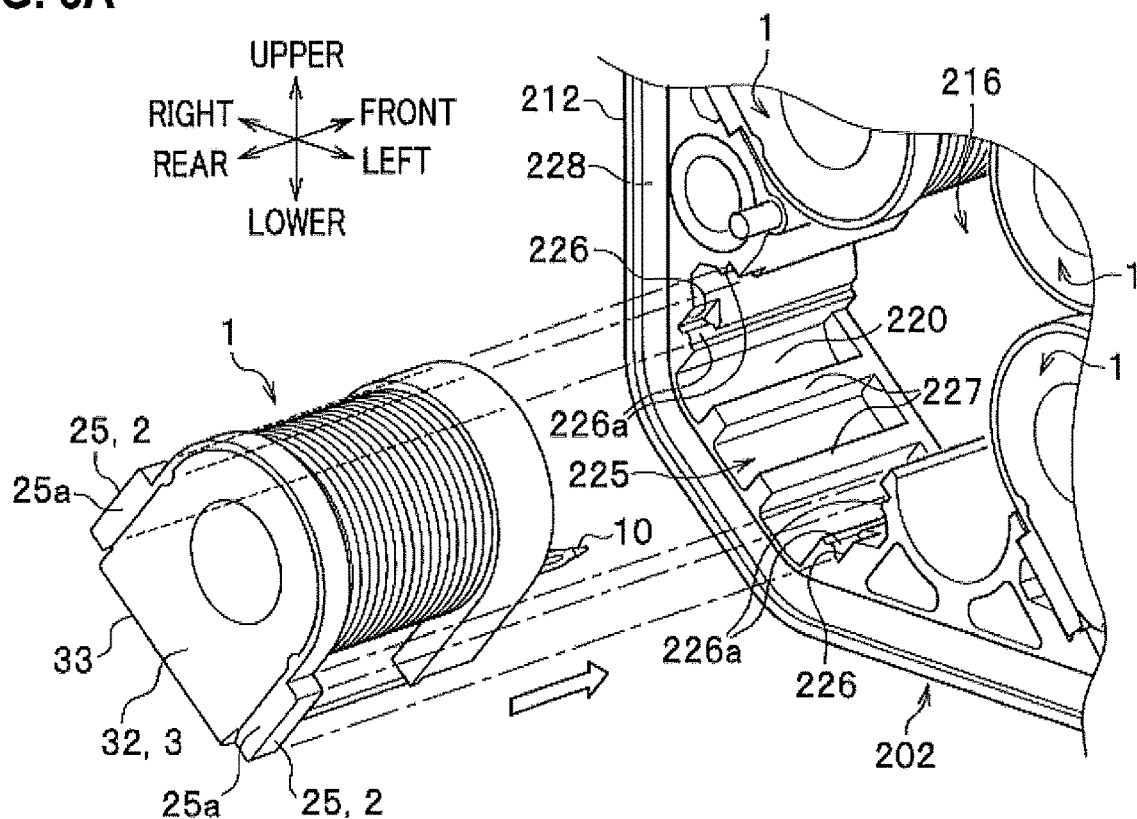
FIGS. 8A and 8B are views showing the electric component assembly of the first embodiment, where

The second peripheral wall portion 212 has an uneven-shaped holding wall 220 formed on its inner surface, as shown in FIG. 4. The holding wall 220 includes boss portions 221 protruding inward at right and left sides, a terminal boss portion 222 protruding inward at the upper side, and a holding portion 223 protruding inward at the lower side, of the second accommodation chamber 216. Inside the holding wall 220, there are formed four mounting spaces 225 in total in which the coil assemblies 1 are mounted between the boss portions 221 and the terminal boss 222 adjacent to each other and between the boss portions 221 and the holding portion 223 adjacent to each other. The inner surface shape of the holding wall 220 at each mounting space 225 is the same as each other, and is formed in a shape following the outer surface shape of the coil assemblies 1. Each mounting space 225 is concavely provided at its open-end portion with a pair of groove portions 226 for positioning and fixing the coil assembly 1. The groove portions 226 in each mounting space 225 are formed at opposite potions to each other of the opposingly disposed portions of the holding wall 220. As shown in FIG. 8A, the groove portions 226 have open ends facing toward the coil assembly 1, for receiving outwardly projecting ribs 25 thereof. The groove portions 226 also have closed ends opposite the open ends, the closed ends limiting an extent to which the ribs 25 can be inserted into the groove portions 226. Also, an inner surface of each groove portion 226 is formed with a protrusion 226a that cooperates with a corresponding one of the ribs 25 to give a press-fit effect at the time of fitting. The protrusion 226a protrudes toward the inside of the groove portion 226, and extends in a direction parallel to the fitting direction shown by the arrow in the drawing. When the coil assembly 1 is assembled to the housing, each of the protrusions 226a abuts onto a rib 25 (see FIG. 8B) which is inserted into the groove portion 226 as described below. Note that additional reinforcing ribs 227 are also formed on the inner surface of the holding wall 220 of the housing 202, as shown in FIG. 2.

Figure 10:
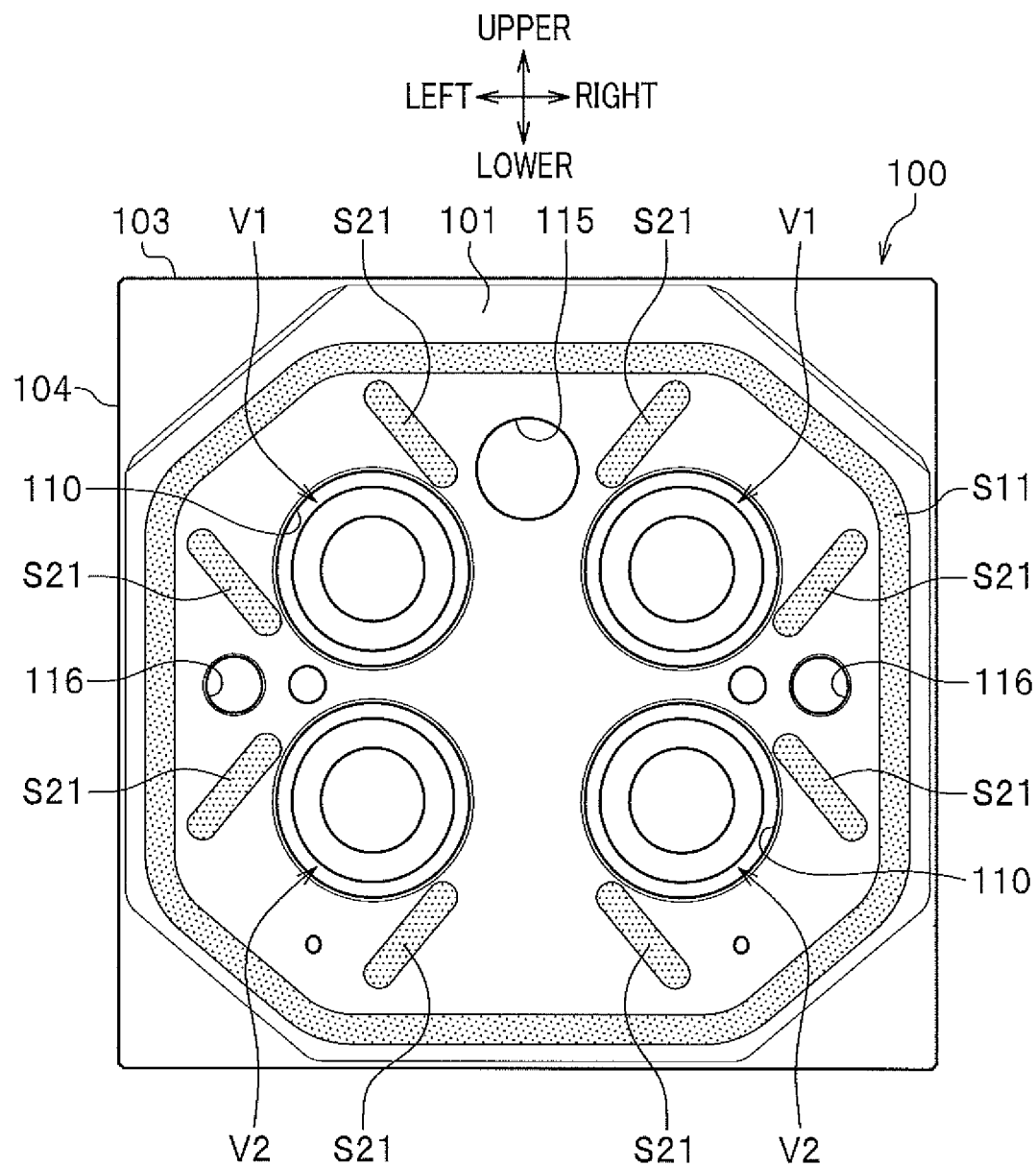
FIG. 10 is a front view of a base body used for the vehicle brake fluid pressure control device of the first embodiment, showing a bonding area in the base body.

The second peripheral wall 212 is formed at its rear end portion with a peripheral groove 228, in which an adhesive is applied to fix the housing 202 to the front surface 101 of the base body 100. The housing 202 is liquid-tightly sealed to the front surface 101 of the base body 100 using the adhesive. The peripheral groove 228 and the ribs 25 abut onto an annular region indicated by a hatching line S11 (see FIG. 10) and linear regions indicated by hatching lines S21 (see FIG. 10) at positions corresponding to the ribs 25 and sandwiching the solenoid valves V1 and V2 in a state of the adhesive being interposed, which hatching lines are shown on the front surface 101 of the base body 100 in FIG. 2. Note that applications of the adhesive to the annular hatching line S11 and the linear hatching lines S21 are performed in the same process.

The housing 202 is fixed to the base body 100 by inserting fixing screws (not shown) through the boss portions 221 of the holding wall 220 of the second accommodation chamber 216 and screwing the fixing screws into screw holes 116 (see FIGS. 2 and 10) of the base body 100.

The lid 203 is a lid made of plastic configured to seal an opening of the front surface of the housing 202 opposite to the base body 100. The lid 203 is fixed to the front-end surface of the housing 202 by means such as welding, bonding, screw fastening.

<Configuration of Coil Assembly>

The coil assembly 1 includes a bobbin 2, a coil 50, a yoke 3, and the press-fit terminal 10 as a connection terminal, as shown in FIGS. 5A and 6A to 6E. The coil assembly 1 is an electric component accommodated in the housing 202 while surrounding the solenoid valves V1 and V2 as shown in FIG. 1. The coil assembly 1 is a solenoid coil that generates a magnetic field around the solenoid valves V1 and V2 by having the coil 50 energized by the control board 201 through the press-fit terminals 10. The coil assembly 1 is fixed to the front surface 101 of the base body 100 via an adhesive as described below.

<Configuration of Bobbin>

The bobbin 2 is a plastic component (insulating component) in which flange portions 22 and 23 are formed at the upper and lower end portions of a cylindrical portion 21 as shown in FIG. 6D. The cylindrical portion 21 has a circular insertion hole 21a as a bobbin side insertion hole penetrating the central portion thereof. The insertion hole 21a communicates with an upper yoke receiving portion 22c formed in an upper flange portion 22 and a hole portion 22a of the upper flange portion 22. In addition, the insertion hole 21a communicates with a lower yoke receiving portion 23a formed in the lower flange portion 23. The insertion hole 21a has an inner diameter D1. As shown in FIGS. 6A and 6E, the flange portions 22 and 23 have a front portion formed in a semicircular shape in a plan view corresponding to the winding shape of the coil 50, and a rear portion formed in a substantially rectangular shape in a plan view corresponding to the shape of the yoke. Note that the inner diameter of the hole portion 22a of the flange portion 22 is larger than the inner diameter D1 of the insertion hole 21a.

As shown in FIG. 6D, the upper flange portion 22 is formed thicker in the upper-lower direction than the lower flange portion 23. The upper flange portion 22 is formed its inside with the upper yoke receiving portion 22c capable of receiving the upper portion 31 of the yoke 3. The upper yoke receiving portion 22c is open at the rear surface and the front surface of the upper flange portion 22. The upper portion 31 of the yoke 3 is received in the upper yoke receiving portion 22c from the rear surface of the upper flange portion 22.

The upper yoke receiving portion 22c has a predetermined clearance between itself and the upper portion 31 of the received yoke 3 in a direction orthogonal to the axial direction of the bobbin 2 (horizontal direction). This allows the upper portion 31 of the yoke 3 to move in the horizontal direction by the amount of the clearance provided in the upper yoke receiving portion 22c.

Note that since the flange portion 22 covers substantially the entire upper portion 31 of the yoke 3, the flange portion 22 is excellent in insulation.

As shown in FIG. 6C, two protrusions 22e (only one side is shown) are formed on the rear edge portion of the upper flange 22, being spaced by a predetermined interval in the right-left direction. The protrusion 22e is a plate-like portion that protrudes rearward from the rear edge portion of the upper flange portion 22 and is formed rectangular in a plan view.

Figure 5A:
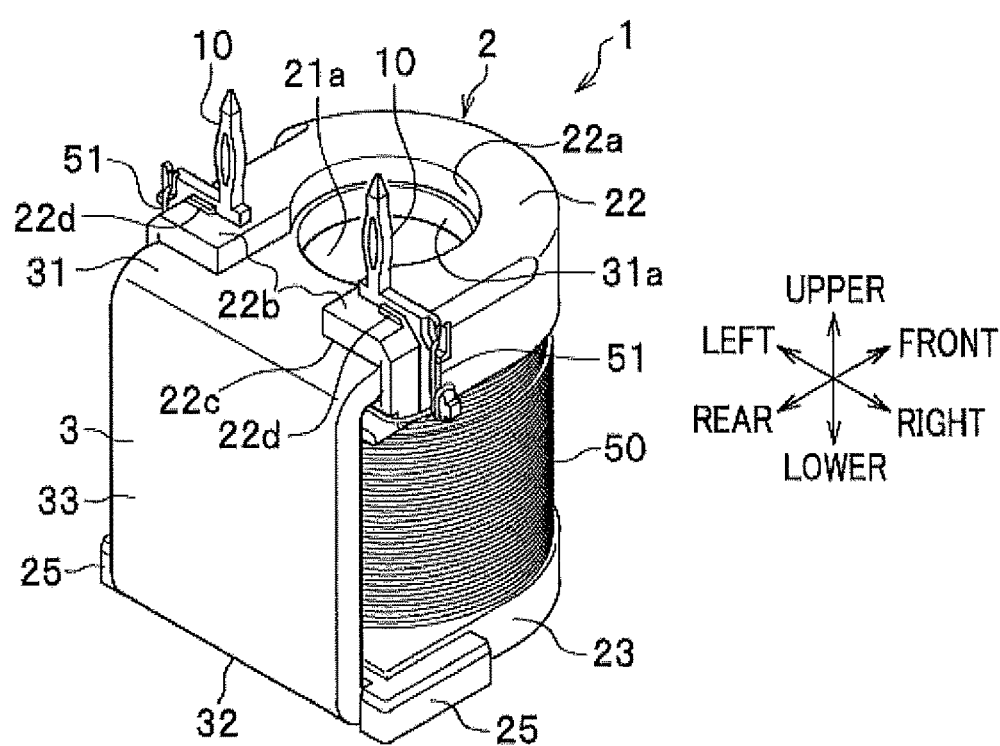
FIGS. 5A to 5B are views showing a coil assembly of the first embodiment, where
Figure 5B:
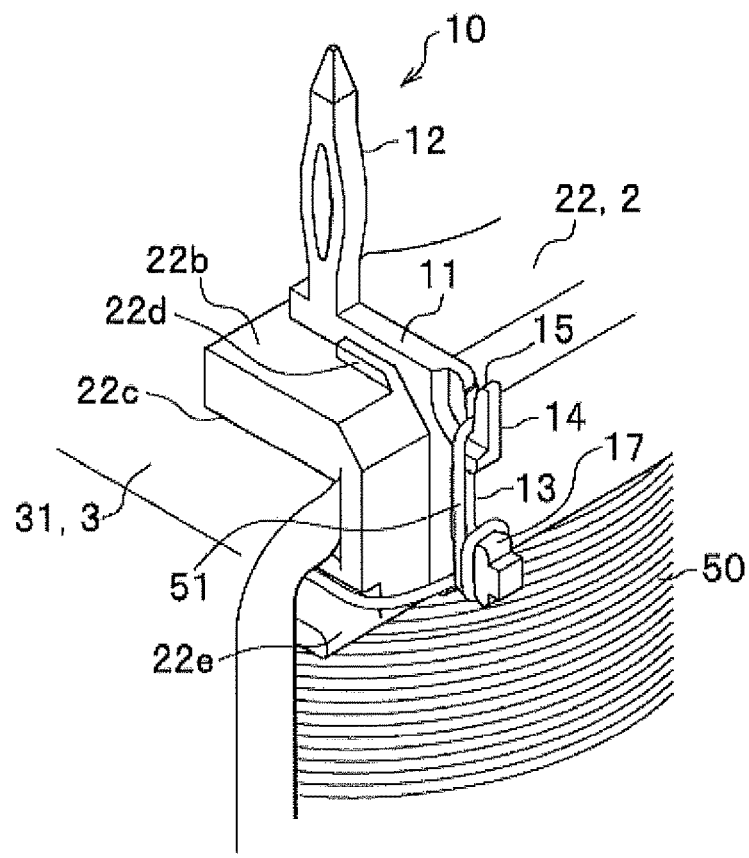

Further, as shown in FIGS. 5A and 5B, terminal support portions 22b for supporting the base portions 11 of the two press-fit terminals 10 are formed on the right and left rear portions of the upper flange portion 22. A portion of the press-fit terminals 10 is embedded in the terminal support portion 22b by insert molding. That is, the terminal support portion 22b (the upper flange portion 22) works as an insulator of the press-fit terminal 10.

The upper portion 31 of the yoke 3 received in the upper yoke receiving portion 22c is disposed below the terminal support portions 22b. That is, the two press-fit terminals 10 are supported on the upper portion 31 of the yoke 3 via the terminal support portions 22b. On the other hand, the terminal support portions 22b cover the portions of the upper portion 31 of the yoke 3, i.e., the portions supporting the press-fit terminals 10. Thereby, insulation between the press-fit terminals 10 and the yoke 3 is achieved.

As shown in FIG. 6D, a lower yoke receiving portion 23a capable of receiving the lower portion 32 of the yoke 3 is formed inside the lower flange portion 23. The lower yoke receiving portion 23a is open at the rear surface and the lower surface of the lower flange portion 23. That is, the lower portion 32 of the yoke 3 is exposed at the lower surface of the coil assembly 1 (see FIG. 6E). The lower portion 32 of the yoke 3 is received in the lower yoke receiving portion 23a from the rear surface of the lower flange portion 23.

As shown in FIG. 6E, curved convex portions 23b protruding inward are formed on the right and left portions facing each other of the inner surface of the lower yoke receiving portion 23a. The lower yoke receiving portion 23a has a predetermined clearance between itself and the lower portion 32 of the received yoke 3 in the direction orthogonal to the axial direction of the bobbin 2 (horizontal direction) similarly to the upper yoke receiving portion 22c described above. This makes the lower portion 32 of the yoke 3 movable in the horizontal direction by an amount of the clearance within the lower yoke receiving portion 23a.

Square-shaped ribs 25 are formed on the right- and left-side surfaces of the rear portion of the lower flange portion 23 (the outer surface of the coil assembly 1 intersecting with the fitting direction). The ribs 25 work as fitting portions (positioning portions) when the coil assembly 1 is fitted to the second accommodation chamber 216 of the housing 202 (see FIG. 3). Specifically, as shown in FIGS. 2 and 3, the ribs 25 are inserted into the groove portions 226 provided in the mounting space 225 of the second accommodation chamber 216. Then, the ribs 25 abut onto the protrusions 226a of the groove portions 226, and the ribs 25 are press-fitted into the groove portions 226. This press-fitting creates an interference fit between the coil assembly 1 and the housing 202 which restricts the movement of the coil assembly 1 in a direction other than the fitting direction into the housing 202 (the arrow direction in FIG. 8A, the axial direction of the coil assembly 1) and such press-fit also restricts rotation of the coil assembly 1 around an axis parallel to the fitting direction. It will be understood, however, that movement of the coil assembly in a direction opposite the fitting direction, to disassemble the vehicle brake fluid pressure control device during maintenance or repair, is also allowed by the structure described above.

Figure 8B:
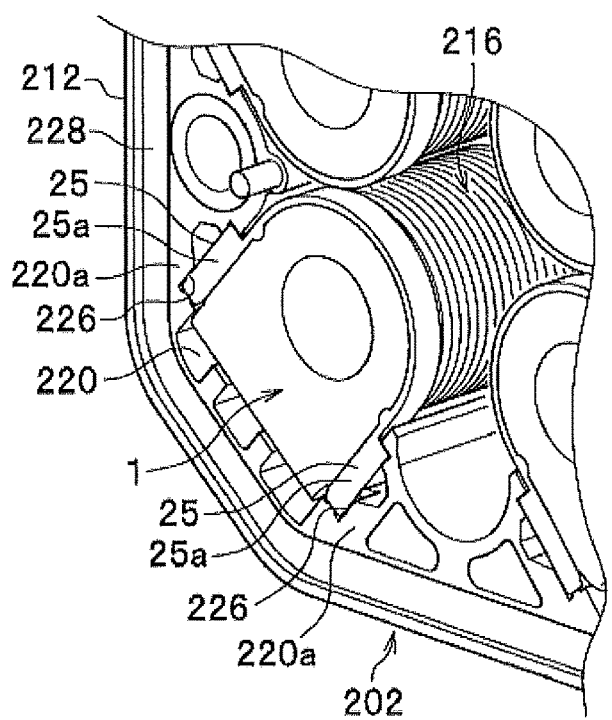
Figure 9:
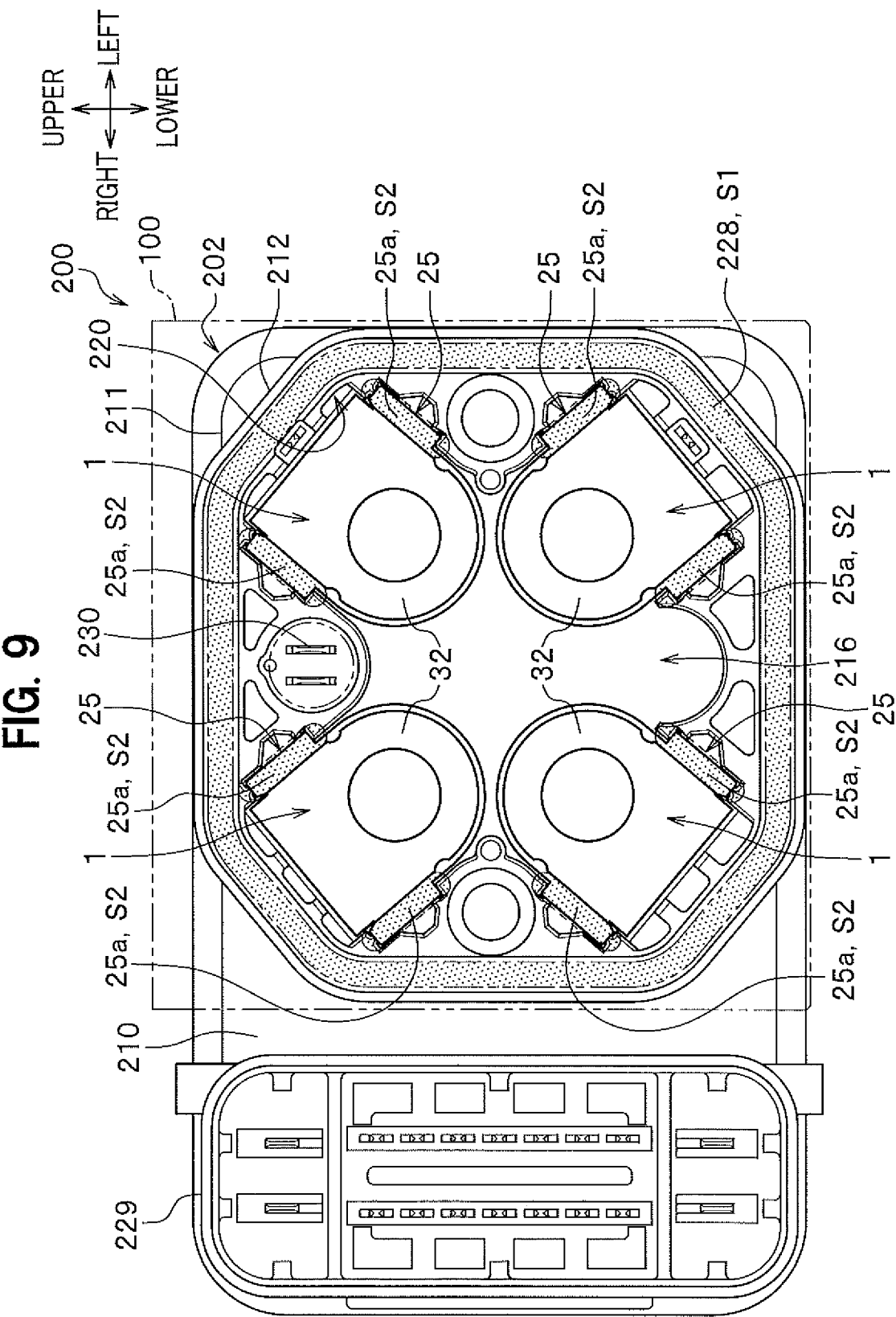
FIG. 9 is a rear view of the electric component assembly of the first embodiment, showing a housing adhesion margin and an electric component adhesion margin in the electric component assembly.

On the other hand, the rib 25 also functions as an electric component adhesion margin S2 (see FIG. 9) for fixing the coil assembly 1 to the front surface 101 of the base body 100 with an adhesive. Specifically, as shown in FIG. 8B, the lower surface 25a of the rib 25 is disposed flush with the rear surface 220a of the holding wall 220 in a state of the rib 25 being press-fitted into the groove portion 226. Thereby, the lower surface 25a of the rib 25 can abut onto the front surface 101 of the base body 100, and functions as an electric component adhesion margin S2 for fixing the coil assembly 1 with an adhesive.

Note that the ribs 25 may be, for example inserted into a groove portion provided in an intermediate wall portion (not shown) provided inside the housing 202.

Here, the adhesive is not limited to one that is interposed only on the lower surface 25a of the rib 25, but may be configured to be interposed ranging from the rib 25 to the lower surface of the lower portion 32 of the yoke 3. Or, the adhesive may be interposed partially on the lower surface 25a of the rib 25. In any case, the adhesive may be interposed so that the coil assembly 1 may be fixed to the front surface 101 of the base body 100 by the adhesive.

The bobbin 2 as described above is produced, for example, by injection molding or the like. At the same time as the bobbin 2 is injection-molded, the press-fit terminals 10 are insertion-molded in a state of being integrally joined to the flange portion 22.

<Configuration of Yoke>

The yoke 3 is a member attached to the bobbin 2 and formed of a magnetic metal material. As shown in FIGS. 5A and 6D, the yoke 3 is composed of an upper portion 31, a lower portion 32, and a side portion 33 connecting the upper portion 31 and the lower portion 32. The yoke 3 is formed in a substantially channel-shape in a longitudinal cross section (see FIG. 6D).

The upper portion 31 is a portion received in the upper yoke receiving portion 22c of the upper flange portion 22 of the bobbin 2. The upper portion 31 has the same outer shape as the upper flange portion 22 of the bobbin 2 and has a front portion formed in a semicircular shape and a rear portion formed in a substantially rectangular shape. The upper portion 31 is adapted to be received in the upper yoke receiving portion 22c with the above-described clearance remained, and movable in the horizontal direction with respect to the upper yoke receiving portion 22c.

Note that the upper portion 31 has the outer shape formed to be slightly smaller in size than the lower portion 32, so that the upper and lower portions can be easily distinguished at a time of fitting work.

The upper portion 31 is disposed below the press-fit terminal 10 intervened by the upper flange portion 22 by being received in the upper yoke receiving portion 22c. That is, the upper portion 31 supports the press-fit terminal 10 (the terminal portion 12, the base portion 11) on an imaginary extension in the axial direction of the terminal portion 12.

The lower portion 32 is a portion received in the lower yoke receiving portion 23a of the flange portion 23 on the lower side of the bobbin 2 (see FIG. 6D). The lower portion 32 has a front portion formed in a semicircular shape and a rear portion formed in a substantially rectangular shape, similarly to the outer shape of the upper portion 31.

In the lower portion 32, as shown in FIG. 6E, concave portions 32b are formed at portions facing the convex portions 23b of the lower yoke receiving portion 23a. With the lower portion 32 received in the lower yoke receiving portion 23a, the convex portions 23b of the lower yoke receiving portion 23a are adapted to be loosely fitted in the concave portions 32b of the lower portion 32 (fitted in a gap). The lower portion 32 is adapted to be received in the lower yoke receiving portion 23a at a clearance therefrom, and is movable in the horizontal direction with respect to the lower yoke receiving portion 23a with the convex portions 23b loosely fitted to the concave portions 32b as described above. That is, the convex portion 23b is fitted in the concave portion 32b while allowing the horizontal movement described above.

As shown in FIG. 6D, a circular insertion hole 31a is formed in the upper portion 31 of the yoke 3 as a yoke-side insertion-mounting hole, and a circular mounting hole 32a is formed in the lower portion 32. These insertion holes 31a and 32a have the same inner diameter D2. The inner diameter D2 is set to a size that can be fitted to and externally receive the solenoid valve V1 (V2). Here, the relationship between the inner diameter D1 of the insertion hole 21a of the bobbin 2 and the inner diameter D2 of the insertion holes 31a and 32a of the yoke 3 described above is set such that the inner diameter D1>the inner diameter D2, that is, the inner diameter D1 of the bobbin 2 is larger than the inner diameter D2 on the yoke 3.

<Configuration of Press-Fit Terminal>

Two press-fit terminals 10 are metal components that are partially insertion-molded in the terminal support portions 22b (bobbin 2) as shown in FIG. 5B. As shown in FIG. 5A, the two press-fit terminals 10 are disposed at a predetermined interval in the right-left direction. The ends of the winding 51 are electrically connected to the two press-fit terminals 10, respectively.

As shown in FIGS. 7A to 7D, the press-fit terminal 10 includes a plate-like base portion 11, a terminal portion 12 protruding upward from the upper portion of one end of the base portion 11, and a connection portion 13 protruding downward from the lower portion of the other end of the base portion 11.

Figure 7A:
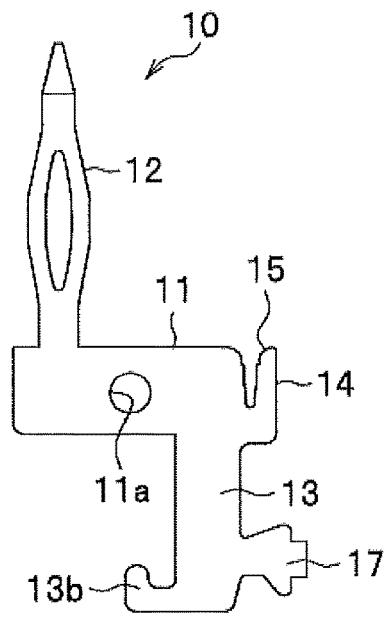
FIGS. 7A to 7D are views showing a press-fit terminal which is a component of the coil assembly of the first embodiment, where

Most of the base portion 11 is embedded in the terminal support portion 22b as shown in FIG. 5B. The upper portion of the base portion 11 is exposed from the terminal support portion 22b. As shown in FIG. 7A, the base portion 11 is formed with an insertion hole 11a that allows plastic to enter therein at a time of molding. The base portion 11 is reinforced and supported by a reinforcing rib 22d provided on the terminal support portion 22b as shown in FIG. 5B.

The terminal portion 12 vertically protrudes upward (outward in the axial direction of the bobbin 2) from the upper portion of one end of the base portion 11. That is, the terminal portion 12 extends upward of the upper flange 22. The tip of the terminal portion 12 bulges in an annular shape to be press-fitted to the through-hole 201a (see FIG. 1) of the control board 201 (see FIG. 1).

The connection portion 13 is a portion to which the winding 51 of the coil 50 is connected. At the connection portion 13, the plate thickness of the contact portion 14 that is a portion to be in contact with the winding 51 is formed thinner than the plate thickness of other portions of the connection portion 13. That is, the press-fit terminal 10 which is easily restricted in thickness due to press-fitting is configured so that the connection portion 13 to which the winding 51 is connected is made thinner so that the coating of the winding 51 is scraped off by contact.

Figure 7B:
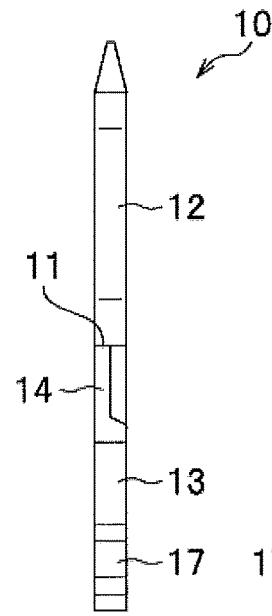
Figure 7C:
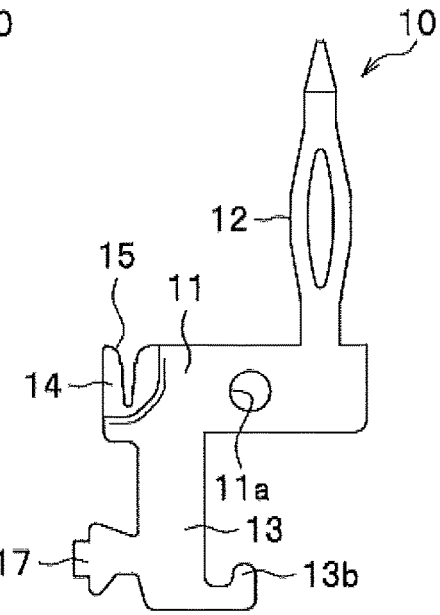
Figure 7D:
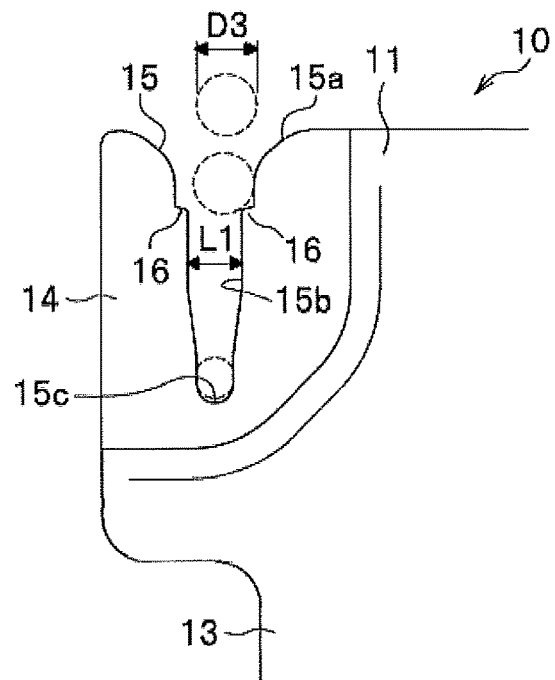

As shown in FIG. 7D, the contact portion 14 is formed with a groove 15 having a substantially V-shaped cross section. The upper edge portion of the groove 15 extends in a rounded shape. A pair of step portions 16 protruding toward the inside (the inner side) of the groove 15 is formed at opposing portions to the inner surface of the groove 15. The groove 15b is formed narrower at the step portions 16. The width L1 (the width in the right-left direction) of the groove 15b at the step portion 16 of the groove 15 is formed smaller than the wire diameter D3 of the winding 51 (wire diameter with the film provided). The groove 15 is formed narrower toward the deepest portion 15c.

As shown in FIGS. 7A and 7C, the side of the lower portion of the connection portion 13 is formed with a protrusion 17 for winding the winding 51 between the groove 15 and the protrusion. Furthermore, the lower end portion of the connection portion 13 is formed with a hook-shaped portion 13b which protrudes like a hook toward the terminal support portion 22b (see FIG. 5B). The hook-shaped portion 13b is embedded in the terminal support portion 22b (see FIG. 5B), which is not shown.

The press-fit terminal 10 is produced by, for example, pressing (press punching). The thin contact portion 14 is formed to be thin by being further pressed after the press-punching. Thereafter, the groove 15 is punched and formed. Note that the contact portion 14 may be formed by pressing simultaneously with press punching, or may be formed first by pressing and then punching.

<Configuration of Coil>

As shown in FIG. 5A, the coil 50 is formed with the winding 51 wound around the cylindrical portion 21 of the bobbin 2. The winding 51 at both ends are wound around the connection portions 13 of the press-fit terminals 10, and the coil 50 and each of the press-fit terminals 10 are electrically connected.

<Fitting of Coil Assembly with Housing>

Fitting of the coil assembly 1 with the housing 202 is performed through the rear surface of the second accommodation chamber 216 as shown in FIG. 8A. In this case, the coil assembly 1 is inserted into the mounting space 225 while directing the press-fit terminal 10 to the mounting space 225 and the side portion 33 of the yoke 3 to the reinforcing rib 227 of the mounting space 225. Note that the shape of the press-fit terminal 10 is simplified in FIG. 8A.

When the coil assembly 1 is inserted in the fitting direction as shown by an arrow in FIG. 8A, each of the ribs 25 of the flange portion 23 of the bobbin 2 abuts onto the opening edge of each groove portion 226 of the mounting space 225. In this state, the coil assembly 1 is pushed in the fitting direction, and the ribs 25 are inserted into the respective groove portions 226.

This insertion positions and fixes the coil assembly 1 at a predetermined position of the second accommodation chamber 216 of the housing 202.

<Fitting of Housing with Base Body>

After each coil assembly 1 is fitted in the housing 202, the adhesive is applied to the annular hatching line S11 and the linear hatching lines S21 on the front surface 101 of the base body 100, which lines S11 and S21 correspond respectively to the housing adhesion margin S1 of the peripheral groove 228 of the housing 202 and the electric component adhesion margin S2 of the lower surface 25a of the rib 25 of each coil assembly 1. Thereafter, the housing 202 is brought close to the front surface 101 of the base body 100, and the rear end of the housing 202 is made to abut onto the front surface 101 of the base body 100 while each coil assembly 1 is being mounted on the solenoid valves V1 and V2 protruding on the front surface 101. As a result, the housing 202 and each coil assembly 1 are bonded to the front surface 101 of the base body 100 with the adhesive interposed between the base body 100 and the housing adhesion margin S1 and the electric component adhesion margins S2. Thereafter, a fixing screw (not shown) inserted into the boss portion 221 of the holding wall 220 of the second accommodation chamber 216 is screwed into the screw hole 116 (see FIG. 2) of the base body 100. Thereby, the housing 202 and each coil assembly 1 are fixed to the front surface 101 of the base body 100.

Note that the inner diameter D1 of the insertion hole 21a of the bobbin 2 is larger than the inner diameter D2 of the insertion holes 31a, and 32a of the yoke 3. This enables to move the yoke 3 (move in the direction orthogonal to the axial direction) with respect to the bobbin 2 fixed to the housing 202 when attaching each coil assembly 1 to the solenoid valves V1 and V2. Therefore, even if there is a slight positional deviation between the solenoid valves V1 and V2 and each coil assembly 1, this positional deviation can be absorbed so that the coil assembly 1 can be attached to the solenoid valves V1 and V2. That is, it is possible to absorb the positional deviation between each press-fit terminal 10 and the solenoid valves V1 and V2 and mount each coil assembly 1 while maintaining the state in which each press-fit terminal 10 is positioned at a predetermined position.

<Fitting Control Board with Housing>

After the housing 202 is fitted to the base body 100, the control board 201 is fitted through the opening of the first accommodation chamber 215 opened on the front side of the housing 202. At this time of fitting, each through-hole 201a of the control board 201 is aligned with the tip of the corresponding press-fit terminal 10, and the control board 201 is pushed toward the coil assembly 1. Then, the terminal portion 12 of the press-fit terminal 10 is press-fitted into the through-hole 201a. Note that during this time, the press-fit terminal 10 is held by the terminal support portion 22b of the coil assembly 1 and keeps upright posture on the terminal support portion 22b. As a result, the terminal portion 12 of the press-fit terminal 10 is secured to be press-fitted into the through-hole 201a.

Thereafter, the lid 203 is liquid-tightly fixed to the front-end portion of the first accommodation chamber 215 by an adhesive or the like.

In the embodiment described above, the coil assembly 1 can be positioned in the housing 202 by inserting the rib 25 into the groove portion 226 of the housing 202 and abutting the rib 25 onto the protrusion 226a. This allows, in this embodiment, to adopt the simple connection structure of the coil assembly 1 to the control board 201 with the press-fit terminal 10 and suitably prevent the drop-off of the coil assembly 1.

Further, the rib 25 is press-fitted into the groove portion 226 by abutting the rib 25 onto the protrusion 226a. This allows to fix the coil assembly 1 to the housing 202, and to accurately dispose the press-fit terminal 10 at the predetermined position of the housing 202, and therefore, to facilitate the position setting of the press-fit terminal 10, and the connection of the press-fit terminal 10 to the control board 201.

Furthermore, the connection terminal is the press-fit terminal 10, and therefore, the electrical connection between the press-fit terminal 10 and the control board 201 can be easy, and the assemblability is improved.

Furthermore, in the vehicle brake fluid pressure control device U of the present embodiment, the coil assembly 1 can be fixed at a predetermined position of the housing 202, and the press-fit terminal 10 can be accurately disposed at the predetermined position. Therefore, the assemblability can be improved and the cost can be reduced.

Second Embodiment

Next, a vehicle brake fluid pressure control device to which the electric component assembly of the second embodiment is applied is described. The present embodiment is described by way of example about a case where the electric component assembly is applied to a vehicle brake fluid pressure control device for a two-wheeled vehicle provided with one brake system. Of course, the present invention may be applied to a vehicle brake fluid pressure control device for a two-wheeled vehicle provided with two brake systems or a vehicle brake fluid pressure control device for a four-wheeled vehicle. Note that the same parts as those in the first embodiment are indicated by the same reference numerals and the detailed description is omitted.

Figure 11:
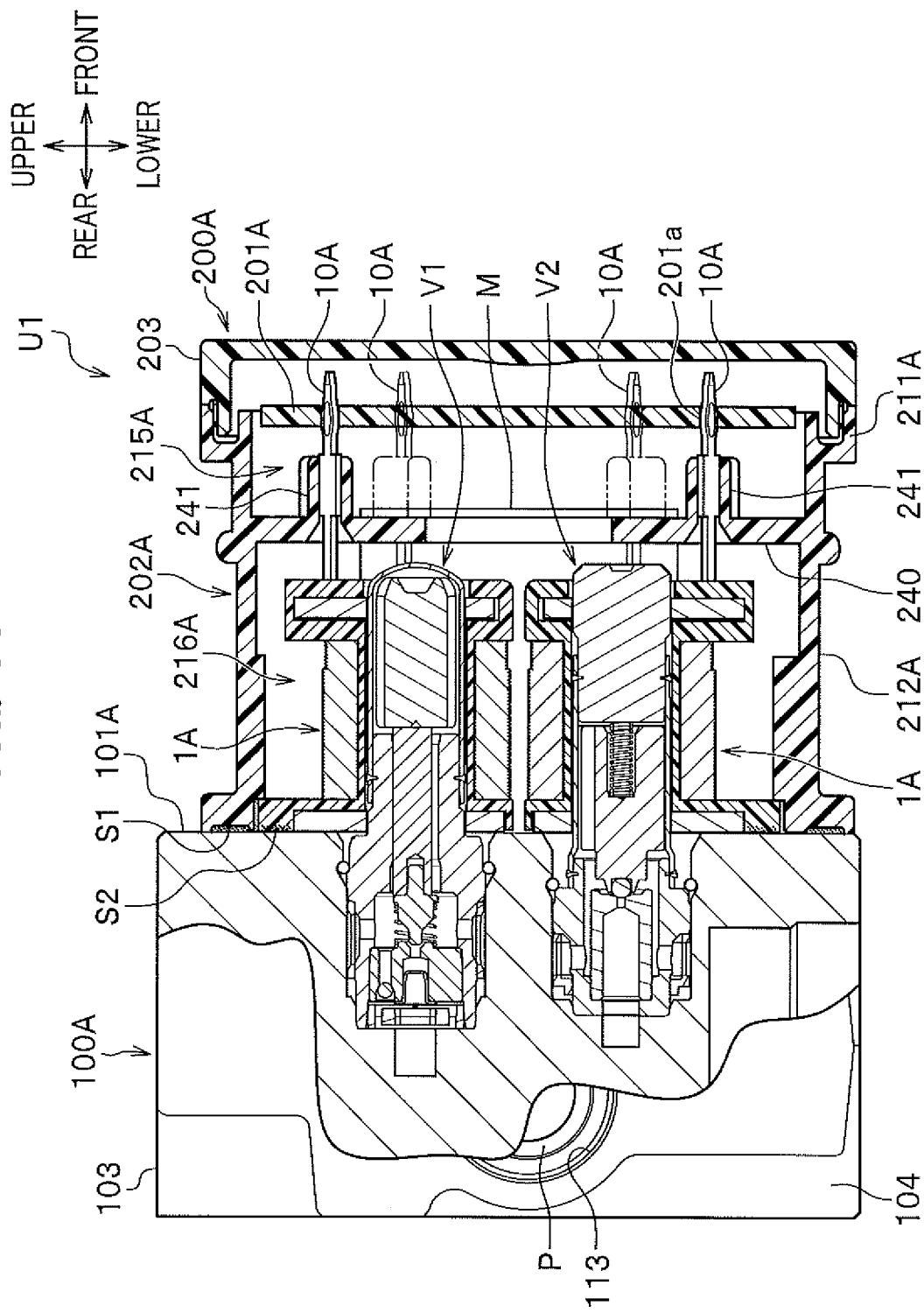
FIG. 11 is a side sectional view of a vehicle brake fluid pressure control device provided with an electric component assembly according to a second embodiment of the present invention.
Figure 12:
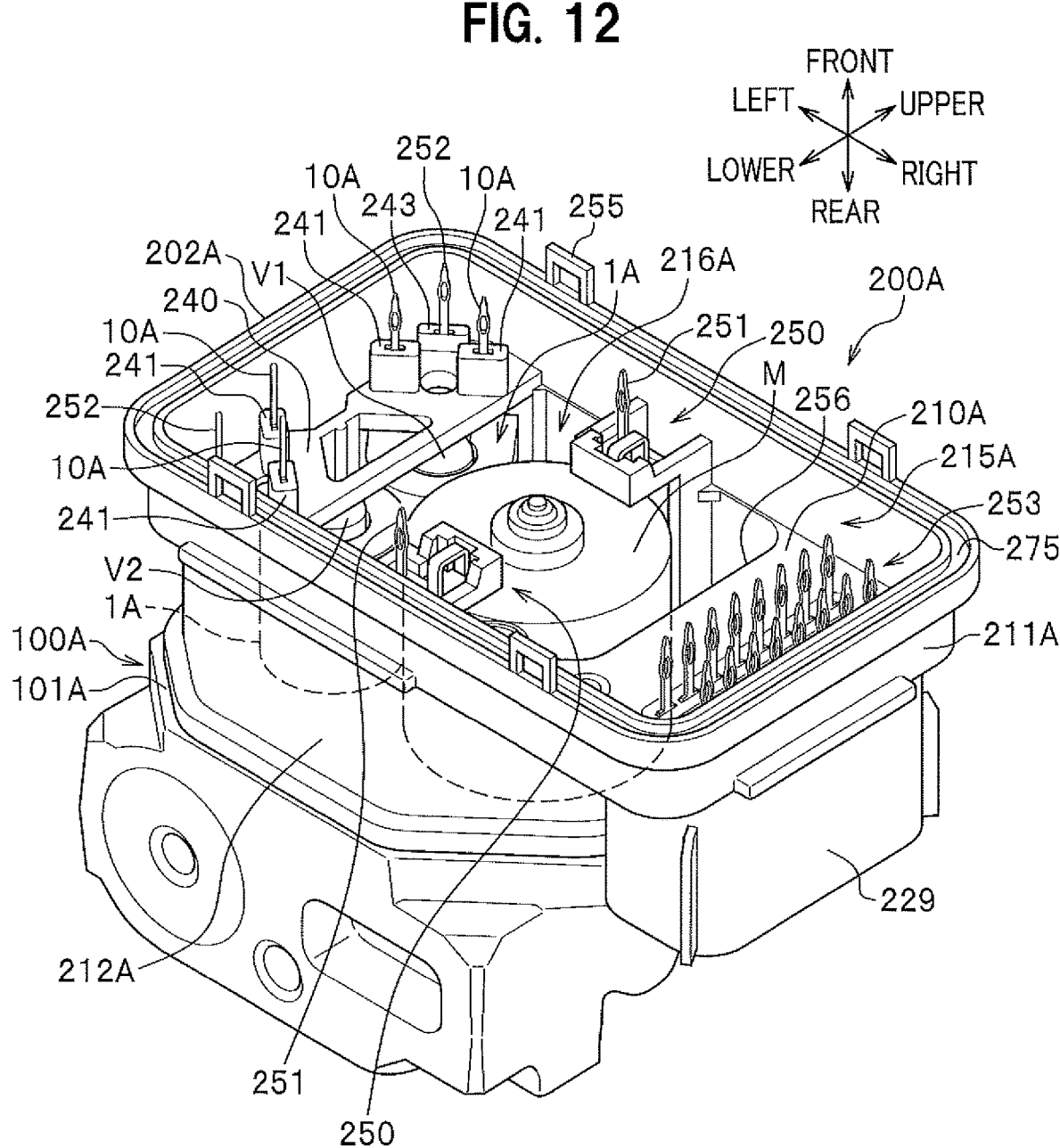
FIG. 12 is a perspective view of the vehicle brake fluid pressure control device according to the second embodiment of the present invention, showing a layout within a housing of the vehicle brake fluid pressure control device.

The vehicle brake fluid pressure control device U1 of the present embodiment has such a structure that the solenoid valves V1 and V2 and the motor M are accommodated in a housing 202A of an electronic control unit 200A which is an electric component assembly as shown in FIGS. 11 and 12.

The vehicle brake fluid pressure control device U1 includes a base body 100A to which solenoid valves V1 and V2 corresponding to one brake system, a motor M, a reciprocating pump P and the like are fitted.

<Configuration of Base Body>

The base body 100A is a metal component formed in a substantially rectangular parallelepiped (see FIGS. 12 and 13), and is formed with a brake fluid passage, oil passage (not shown) inside thereof.

Figure 13:
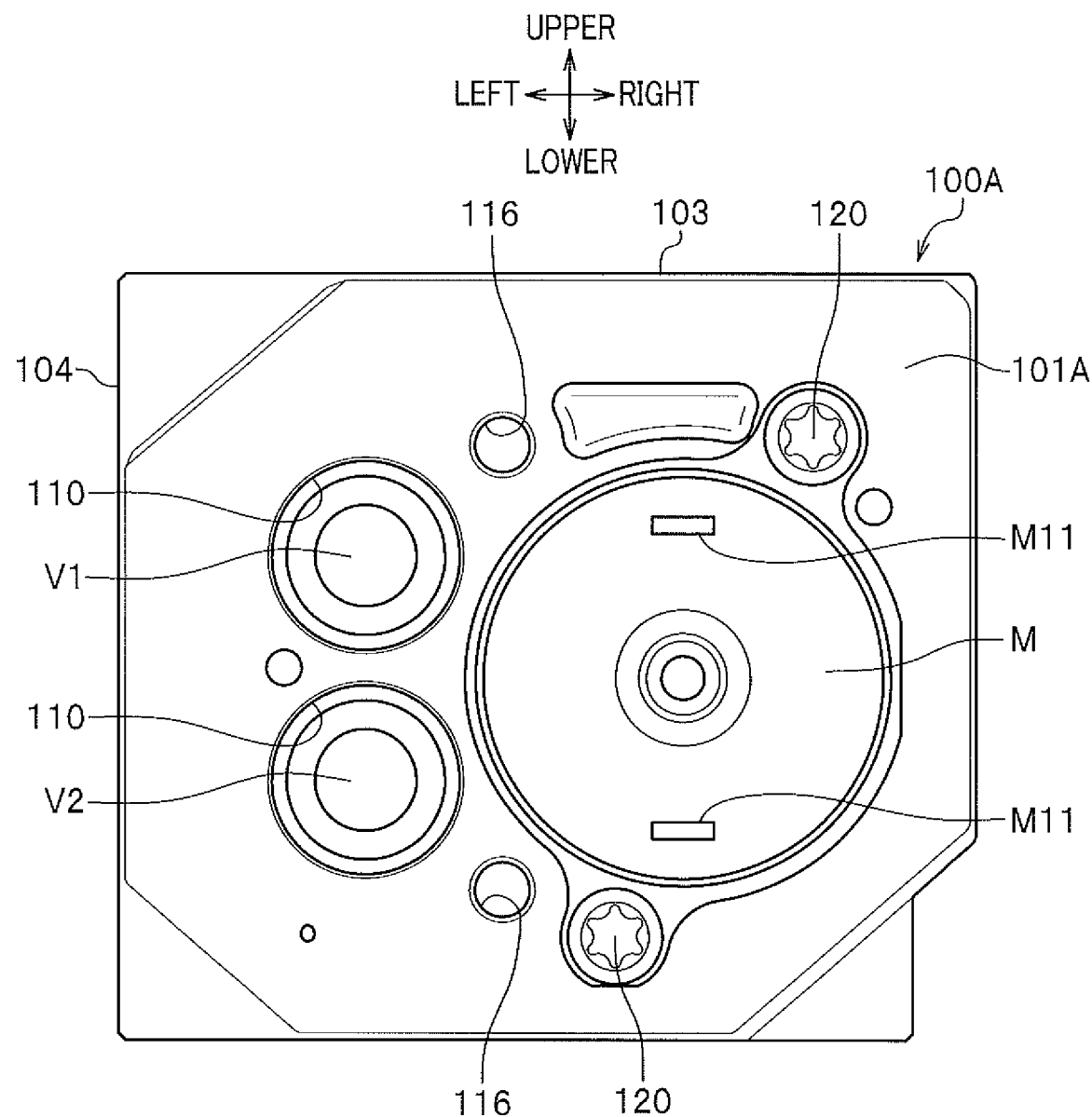
FIG. 13 is a front view of a base body used for the vehicle brake fluid pressure control device according to the second embodiment of the present invention, showing a mounting surface on which the electric component assembly is mounted.
Figure 14:
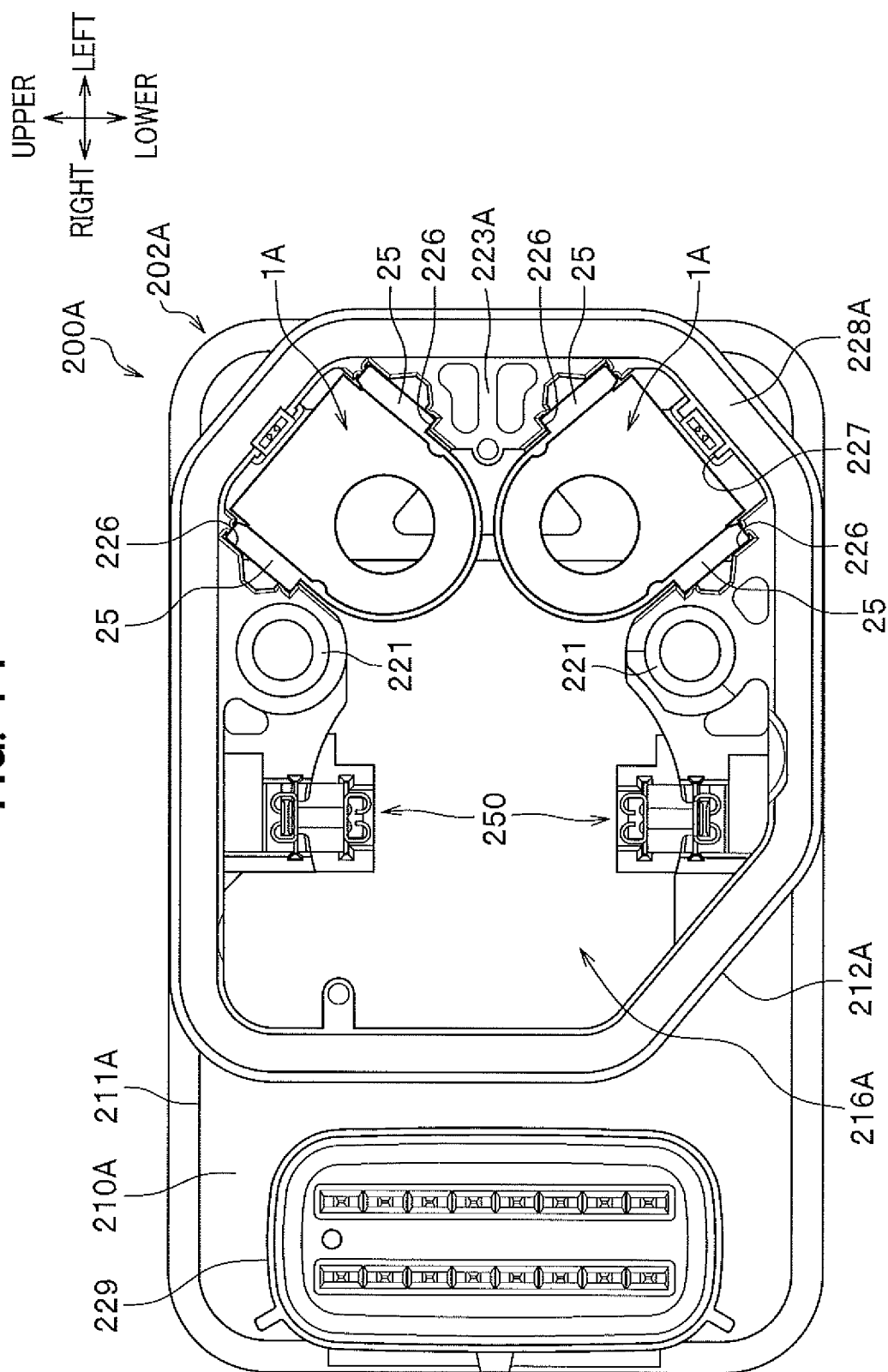
FIG. 14 is a rear view of the electric component assembly of the second embodiment.

A plurality of holes such as bottomed mounting holes 110 with which the solenoid valves V1 and V2 are mounted, bottomed mounting holes (not shown) with which the motor M is mounted, and the like are formed on the front surface 101A which is one of surfaces of the base body 100A as shown in FIG. 13. That is, mounting holes for the solenoid valves V1 and V2 and the motor M are collectively formed on the front surface 101A of the base body 100A. Coil assemblies 1 as electric components are mounted on the solenoid valves V1 and V2, respectively. Each coil assembly 1 is electrically connected to a control board 201A (see FIG. 11, hereinafter the same) using press-fit terminals 10A as described below.

<Configuration of Motor>

Figure 21:
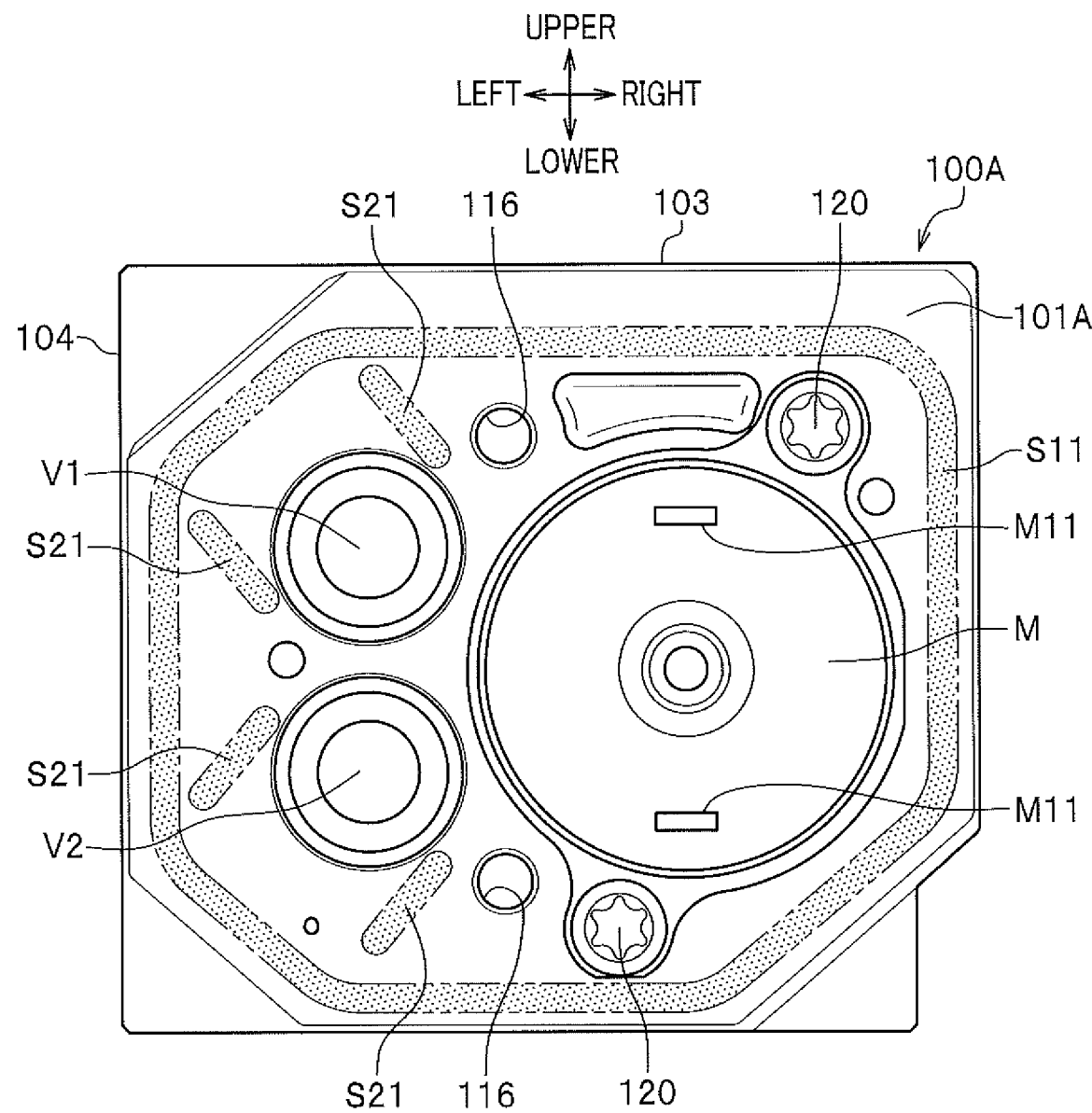
FIG. 21 is a front view of the base body used for the vehicle brake fluid pressure control device of the second embodiment, showing a bonding area in the base body.

The motor M is integrally fixed to a front surface 101A of the base body 100A with bolts 120 (see FIG. 21). A pair of motor bus bars M11 (see FIGS. 13 and 21) are provided on a bottom portion of the cover of the motor M, and connected respectively to the bus bar terminal portions 250 provided on the inner wall (first accommodation chamber 215A) of the housing 202A, as shown in FIG. 12. A press-fit terminal 251 for connecting to the control board 201A is provided upright on the bus bar terminal portion 250.

<Configuration of Electronic Control Unit>

The electronic control unit 200A includes a coil assembly 1A, a control board 201A, a housing 202A, and a lid 203. The coil assembly 1A is fixed to the housing 202A by insertion and press-fitting as in the first embodiment. The housing 202A accommodates the coil assembly 1A and the control board 201A, as well as the solenoid valves V1 and V2 and the motor M protruding from the base body 100A.

The control board 201A controls energization of the coil assembly 1A and the motor M to control opening and closing operation of the solenoid valves V1 and V2 and drive of the motor M.

<Configuration of Housing>

The housing 202A is, as shown in FIG. 11, a box integrally fixed to the front surface 101A of the base body 100A while covering the solenoid valves V1 and V2 and the motor M protruding from the front surface 101A of the base body 100A. The housing 202A is integrally molded from a plastic material as in the first embodiment. The control board 201A and the coil assembly 1A are fitted to the housing 202A.

The housing 202A is open respectively at the front surface on the opposite side to the base body 100A and the rear surface on the same side as the base body 100A.

As shown in FIG. 12, the housing 202A includes a plate-like bottom portion 210A, a first peripheral wall portion 211A provided on the front surface of the bottom portion 210A, and a second peripheral wall portion 212A provided on the rear surface of the bottom portion 210A.

The bottom portion 210A has a substantially rectangular outer shape. The first peripheral wall portion 211A extends forward from the peripheral edge portion of the bottom portion 210A, and has an outer peripheral shape exhibiting a substantially rectangular shape. The first peripheral wall portion 211A forms a first accommodation chamber 215A (see FIG. 11) which accommodates the substantially rectangular control board 201A.

Figure 15:
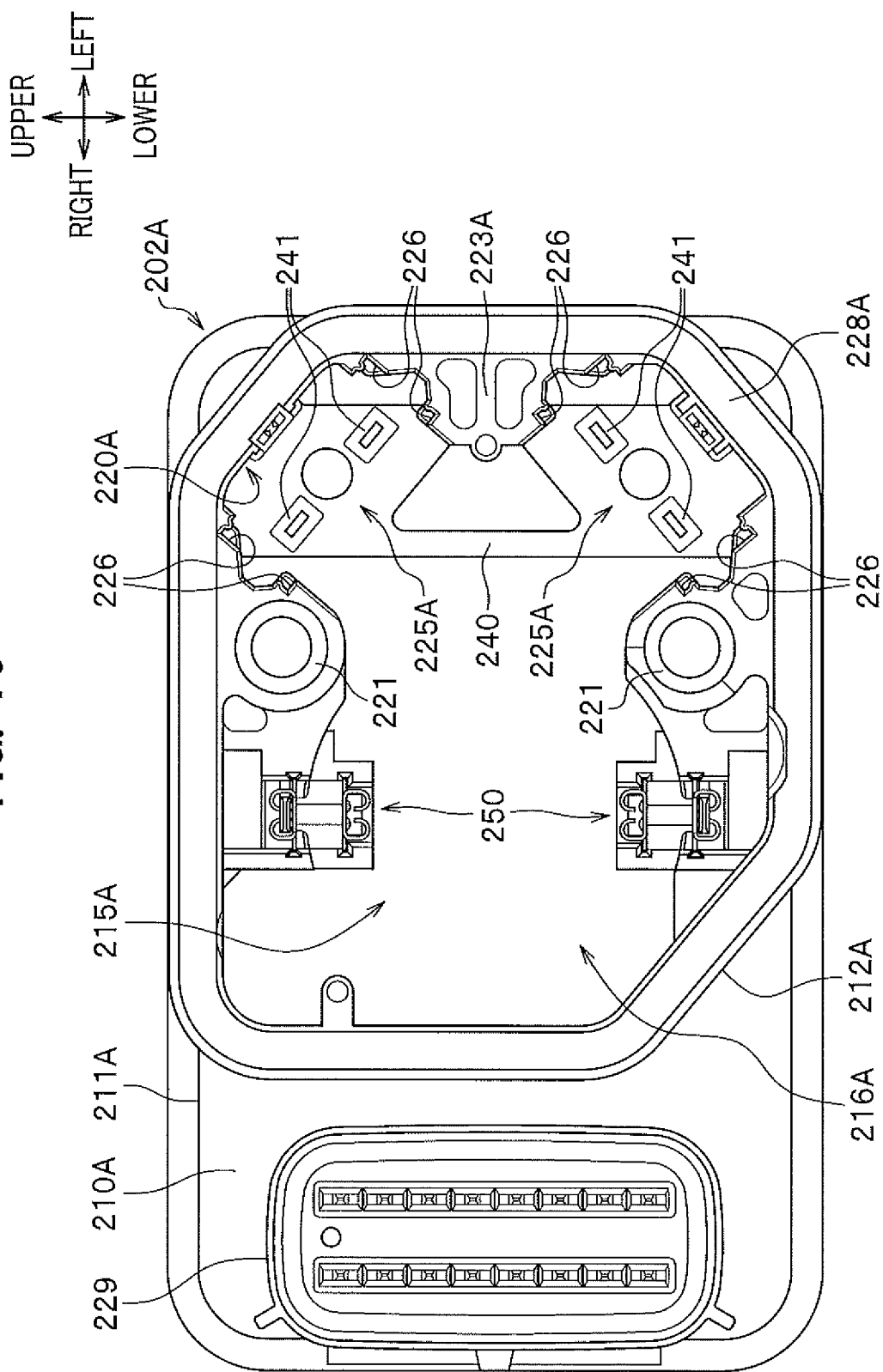
FIG. 15 is a rear view of the housing in the second embodiment.

The second peripheral wall portion 212A extends rearward from the rear surface of the bottom portion 210A, and has an outer peripheral shape exhibiting a substantially heptagonal shape (see FIG. 15). The second peripheral wall 212A forms a second accommodation chamber 216A (see FIG. 11) which accommodates the coil assembly 1A and the motor M. The second peripheral wall portion 212A is formed longer in the front-rear direction than that of the first embodiment in order to be able to accommodate the motor M (motor cover) longer in the axial direction (front-rear direction) than the coil assembly 1A.

The first accommodation chamber 215A and the second accommodation chamber 216A communicate with each other through the opening 256 of the bottom portion 210A, as shown in FIGS. 11, 12, and 15. That is, no partition wall exists between the first accommodation chamber 215A and the second accommodation chamber 216A. Also in the present embodiment, the housing 202A has a structure in which no partition wall exists in this way, and thereby the coil assembly 1A and the motor M can be disposed to extend from the second accommodation chamber 216A through the first accommodation chamber 215A as shown in FIG. 11. That is, the space in the front to rear direction is effectively used for downsizing, while accommodating the motor M (motor cover) longer in the axial direction (front-rear direction) than the coil assembly 1A.

Figure 18A:
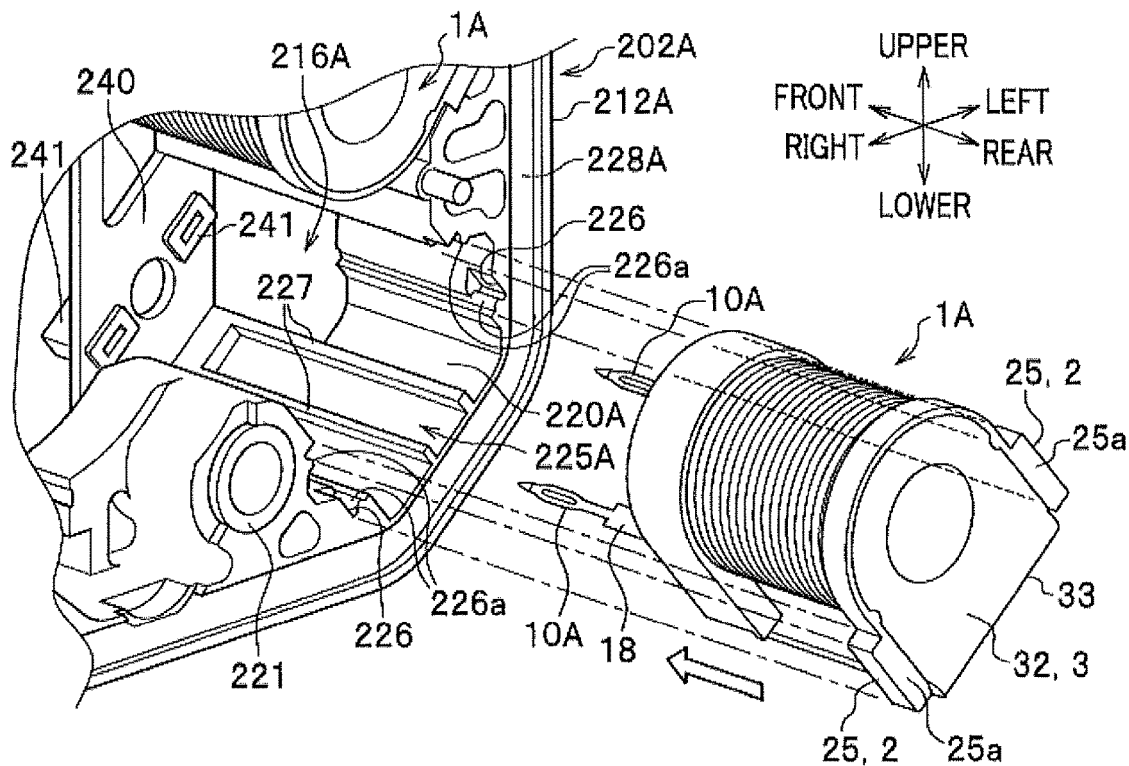
FIGS. 18A, and 18B are views showing the electric component assembly of the second embodiment, where

As shown in FIG. 15, an uneven-shaped holding wall 220A is formed on the inner surface on the rear side of the second peripheral wall portion 212A. The holding wall 220A includes boss portions 221 protruding upward and downward inside the second accommodation chamber 216A, and a holding portion 223A protruding inward at left. Inside the holding wall 220A, two mounting spaces 225A in total in which the coil assembly 1A can be mounted are formed between the adjacent boss portions 221 and the holding portion 223A. The inner surface shape of the holding wall 220A in each mounting space 225A is the same as that of the first embodiment, and formed in a shape matching the outer surface shape of the coil assembly 1A. At the open edge portion of each mounting space 225A, a pair of groove portions 226 for positioning and fixing the coil assembly 1A in the mounting space 225A is concavely provided. In each mounting space 225A, the groove portions 226 are formed at opposing portions of the opposingly disposed holding walls 220 to each other. Each groove portion 226 is provided with a protrusion 226a as shown in FIG. 18A.

As shown in FIG. 15, a plate-like terminal holding portion 240 is provided in each mounting space 225A. The terminal holding portion 240 is provided extending between the upper and lower holding walls 220 on the left side to be disposed in each mounting space 225A.

In the terminal holding portion 240, a guide portion 241 having a substantially rectangular outer shape is protrudingly provided. The guide portion 241 is formed with a slit-like insertion hole 242 (see FIG. 19). The insertion hole 242 is provided at a position corresponding to each press-fit terminal 10A of the coil assembly 1A mounted in the mounting space 225A. Thereby, the press-fit terminal 10A can be inserted into each insertion hole 242.

Note that the press-fit terminals 252 other than the coil assembly 1A are insertion-molded in the housing 202A at the upper and lower corners of the terminal holding portion 240, and guide portions 243 for supporting the press-fit terminals 252 are provided (see FIG. 12).

A peripheral groove 228A is formed at the rear end portion of the second peripheral wall portion 212A. The peripheral groove 228A has an adhesive for fixing it to the front surface 101A of the base body 100A interposed therebetween. The housing 202A is liquid-tightly sealed to the front surface 101A of the base body 100A via the adhesive. The peripheral groove 228A and the ribs 25a abut with the adhesive interposed onto a region indicated by an annular hatching line S11 depicted on the front surface 101A of the base body 100A and a region indicated by linear hatching lines S21 at positions sandwiching the solenoid valves V1 and V2 and corresponding to the ribs 25a as shown in FIG. 21. Note that the application of the adhesive to the annular hatching line S11 and the linear hatching lines S21 is performed in the same process.

The lid 203 is fixed to the opening on the front surface opposite to the base body 100A of the housing 202A.

<Configuration of Coil Assembly>

Figure 16A:
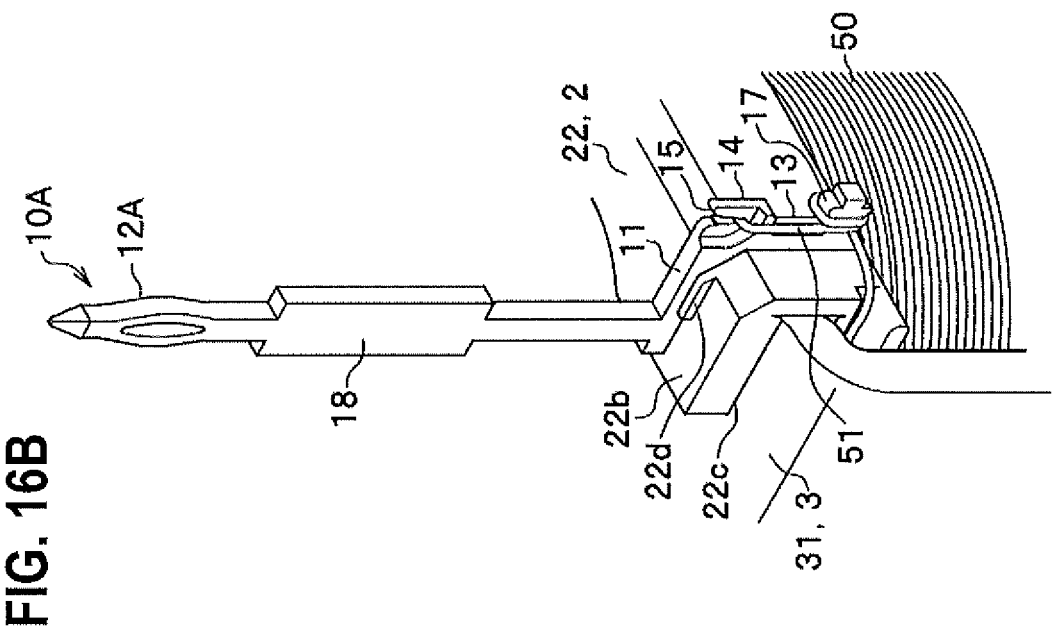
Figure 16B:
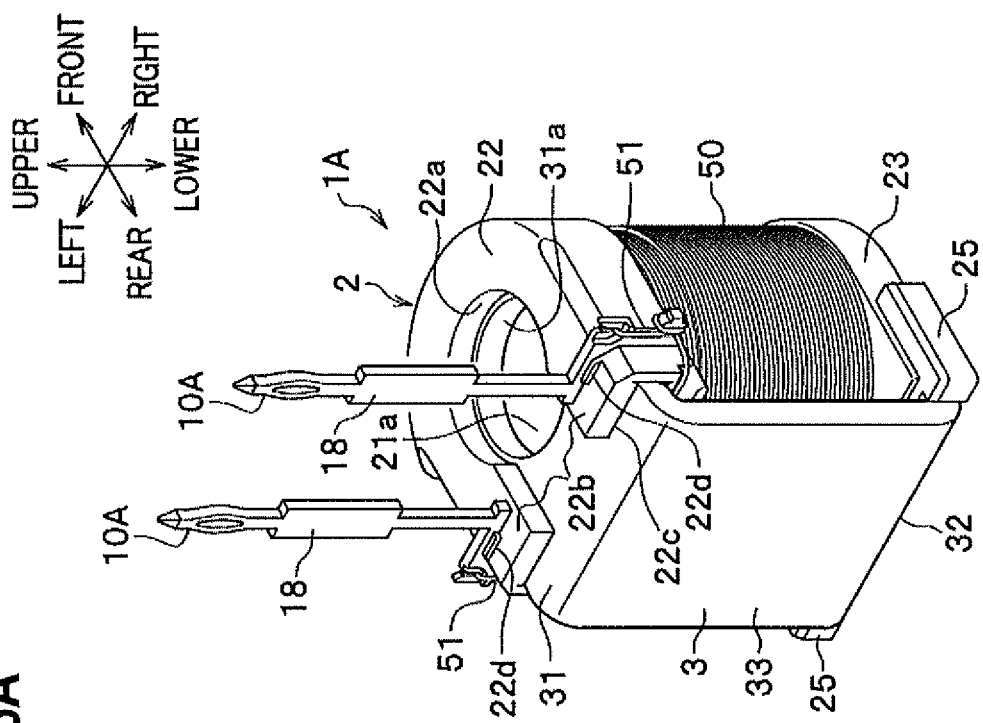
Figure 17A:
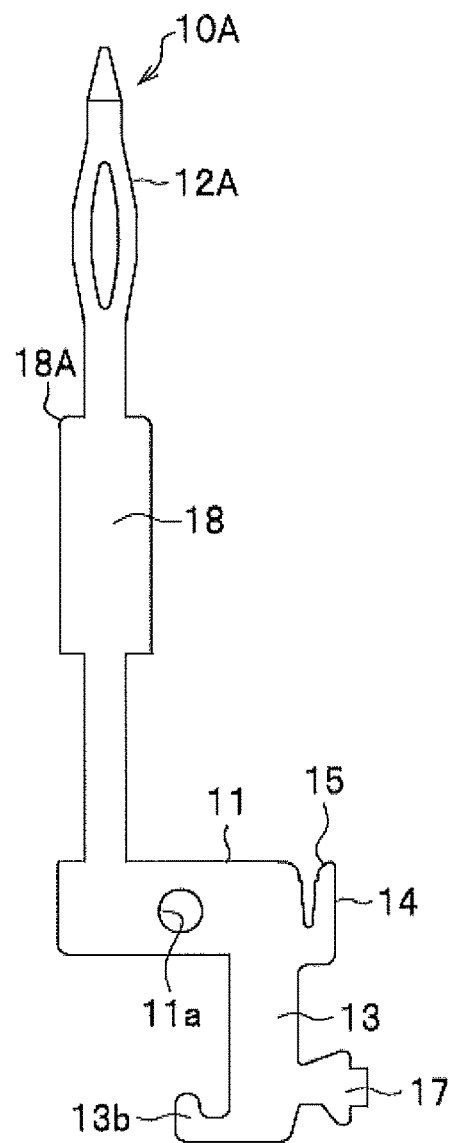
FIGS. 17A, 17B, and 17C are views showing the press-fit terminal in the second embodiment, where
Figure 17B:
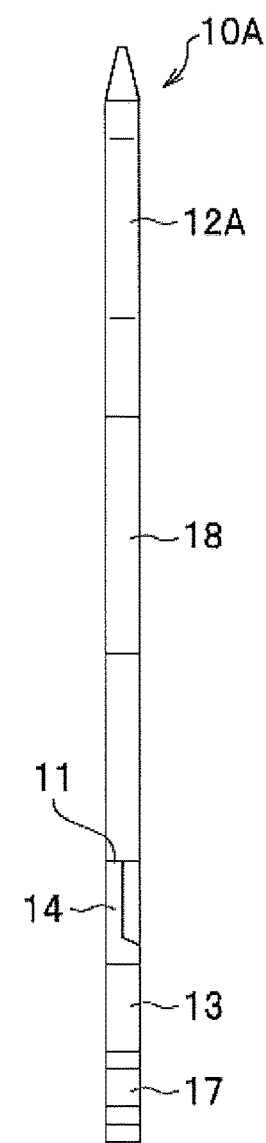
Figure 17C:
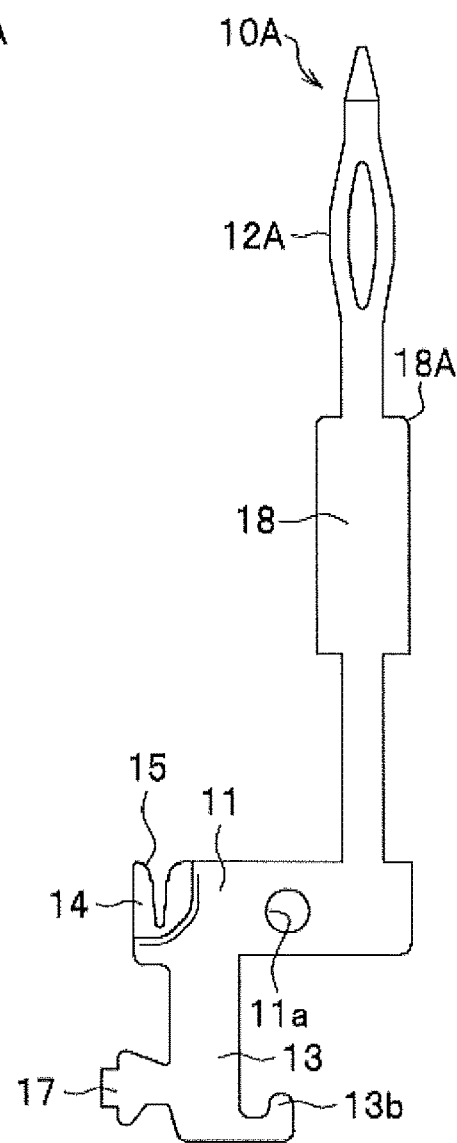

The coil assembly 1A of the present embodiment is different from the coil assembly 1 of the first embodiment in that the coil assembly 1A is provided with a press-fit terminal 10A having a longer total length as shown in FIGS. 16 and 17. There is no change in other points of the coil assembly 1A.

The press-fit terminal 10A is a metal component partially insertion-molded on the terminal support portion 22b of the bobbin 2. As shown in FIG. 16A, the press-fit terminals 10A are disposed at a predetermined interval in the right-left direction. The ends of the winding 51 are electrically connected to the press-fit terminals 10A, respectively.

The press-fit terminal 10A includes, as shown in FIGS. 17A and 17B, a plate-like base portion 11, a terminal portion 12A protruding upward from the upper portion of one end of the base portion 11, and a connection portion 13 protruding downward from the lower portion of the other end of the base portion 11.

The terminal portion 12A is formed to have its total length longer than that of the terminal portion 12 of the first embodiment (see FIGS. 7A to 7C). The total length of the terminal portion 12A is set in accordance with the dimension in the front-rear direction of the second accommodation chamber 216A of the housing 202A. That is, since the present embodiment has such a configuration that the motor M is accommodated in the second accommodation chamber 216A, the total length of the terminal portion 12A is set longer by a length by which the second peripheral wall 212A is extended in the front-rear direction longer than that of the first embodiment.

Figure 18B:
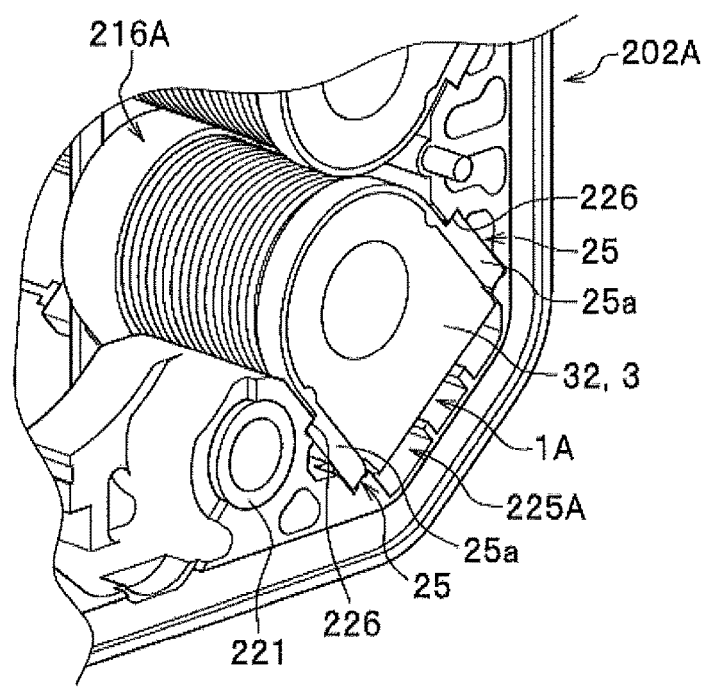
Figure 19:
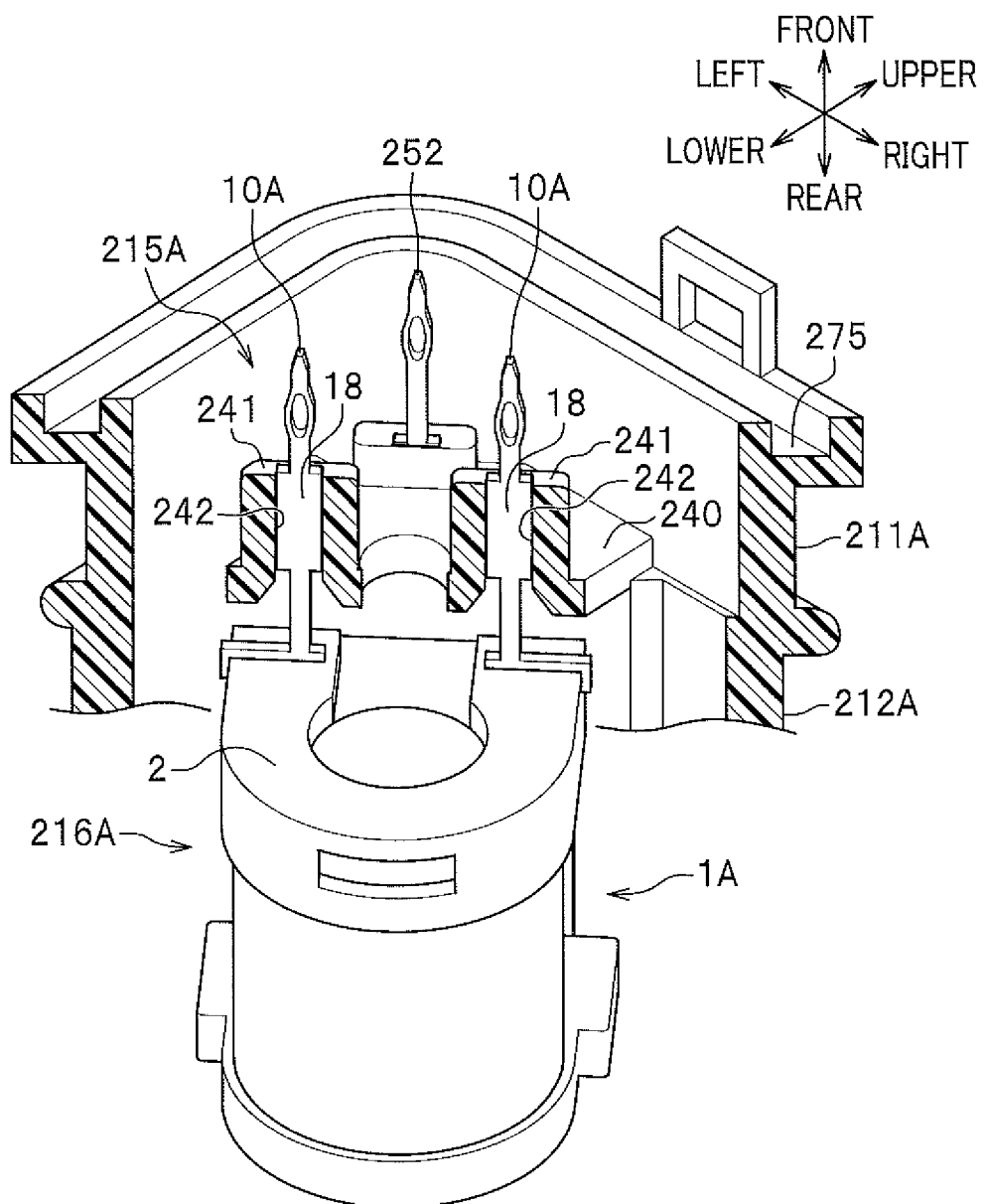
FIG. 19 is an enlarged cross-sectional view showing a state of the press-fit terminals held by the terminal holding portion of the housing.
Figure 20:
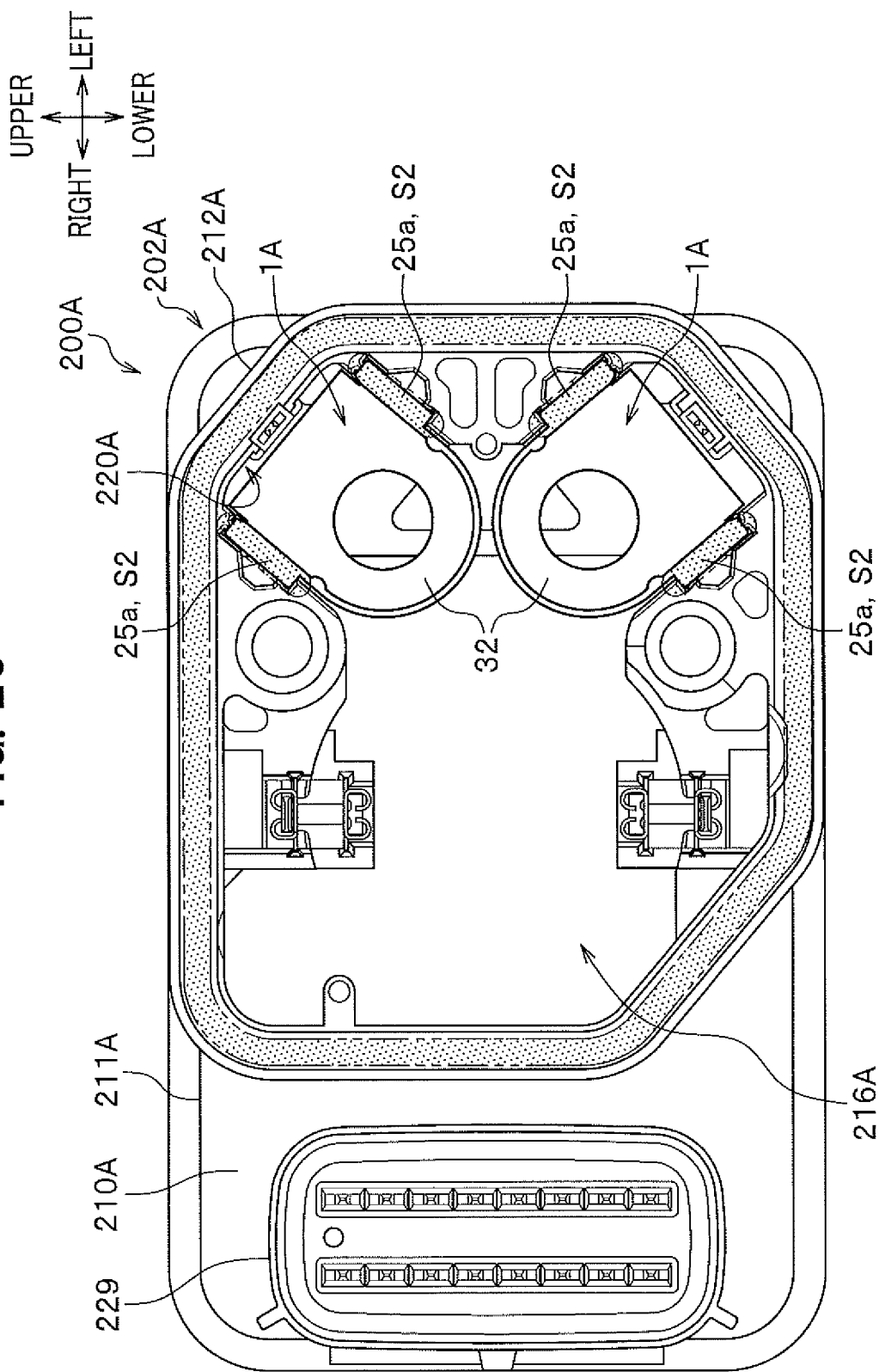
FIG. 20 is a rear view of the electric component assembly of the second embodiment, showing a housing adhesion margin and an electric component adhesion margin in the electric component assembly.

The terminal portion 12A protrudes vertically upward (outward in the axial direction of the bobbin 2) from the upper portion of one end of the base portion 11. A wide portion 18 formed wider than other portions is formed in the middle portion of the terminal portion 12A. The wide portion 18 is held on the inner surface of the insertion hole 242 provided in the guide portion 241 of the terminal holding portion 240 as shown in FIG. 19 when the coil assembly 1A is fitted into the mounting space 225A of the housing 202A (see FIG. 18B). That is, the middle portion of the terminal portion 12A having a long total length is held by the housing 202A via the terminal holding portion 240.

<Fitting of Coil Assembly with Housing>

As in the first embodiment, the fitting of the coil assembly 1A with the housing 202A is performed from the rear surface of the second accommodation chamber 216A, as shown in FIG. 18A. In this step, the coil assembly 1A is inserted into the mounting space 225A with the press-fit terminal 10A directed to the mounting space 225A and the side portion 33 of the yoke 3 directed to the reinforcing rib 227 in the mounting space 225A. Note that the view of the press-fit terminal 10A is simplified in FIG. 18A.

In the course that the coil assembly 1A is proceeded to be inserted into the mounting space 225A, the terminal portion 12A of the press-fit terminal 10A is inserted into the insertion hole 242 of the terminal holding portion 240. In this case, since the end portion 18A of the wide portion 18 of the press-fit terminal 10A nearer to the terminal 12A has an arc-shaped chamfered shape, the terminal 12A can be smoothly inserted into the insertion hole 242. Thereafter, the coil assembly 1A is further pushed in the fitting direction, and the ribs 25 are inserted into and press-fitted to the respective groove portions 226.

This press-fitting process positions and fixes the coil assembly 1A at a predetermined position of the second accommodation chamber 216A of the housing 202A.

<Fitting of Housing with Base Body>

After each coil assembly 1A is fitted into the housing 202A, an adhesive is applied to an annular hatching line S11 and a linear hatching line S21 on the front surface 101A of the base body 100A, which lines S11 and S21 correspond respectively to a housing adhesion margin S1 of the peripheral groove 228A of the housing 202A and an electric component adhesion margin S2 on the lower surface 25a of the rib 25 of each coil assembly 1A. Thereafter, the housing 202A is brought close to the front surface 101A of the base body 100A, and the rear end of the housing 202A is made to abut onto the front surface 101A of the base body 100A while each coil assembly 1A is being mounted onto the solenoid valves V1 and V2 protruding from the front surface 101A. Thereby, the housing 202A and each coil assembly 1A are bonded to the front surface 101A of the base body 100A with the adhesive interposed between the base body 100A and the housing adhesion margin S1 and the electric component adhesion margin S2. Thereafter, the fixing screws 120 (see FIG. 13) inserted into the boss portion 221 of the holding wall 220A of the second accommodation chamber 216A is screwed into the screw hole 116 (see FIG. 13) of the base body 100A. This fixes the housing 202A and each coil assembly 1A to the front surface 101A of the base body 100A.

Also in the present embodiment, when mounting each coil assembly 1A to the solenoid valves V1 and V2, the yoke 3 can be moved (moved in the direction orthogonal to the axial direction) with respect to the bobbin 2 fixed to the housing 202A. Therefore, even if there is a slight positional deviation between the solenoid valves V1 and V2 and each coil assembly 1A, the positional deviation can be absorbed to mount each coil assembly 1A onto the solenoid valves V1 and V2. That is, while keeping the state in which each press-fit terminal 10A is positioned at the predetermined position, the positional deviation of the coil assembly 1A with respect to the solenoid valves V1 and V2 can be absorbed to mount each coil assembly 1A.

<Fitting of Control Board with Housing>

After the housing 202A is fitted to the base body 100A, the control board 201A is fitted through the opening of the first accommodation chamber 215A which is open on the front surface of the housing 202A. At the time of fitting, each through-hole 201a of the control board 201A is aligned with a tip portion of the corresponding press-fit terminal 10A, and the control board 201A is pushed into the coil assembly 1A. Then, the terminal portion 12A of the press-fit terminal 10A is press-fitted into the through-hole 201a. Note that during this time, the press-fit terminal 10A is held by the terminal support portion 22b of the coil assembly 1A, and keeps an upright posture on the terminal support portion 22b. Furthermore, the middle portion of the press-fit terminal 10A can be held on the housing 202A by the terminal holding portion 240.

Note that when the control board 201A is fitted, the connection of the press-fit terminal 251 of the bus bar terminal portion 250 of the housing 202A and the press-fit terminals 253 of the connector portion 229 can be simultaneously performed as shown in FIG. 12.

Thereafter, an adhesive is applied to the groove 275 (see FIG. 12) in the front-end portion of the first accommodation chamber 215A to fix the lid 203 in a liquid tight manner. Note that an engaging portion 255 is provided at the front-end portion, and the positioning at the time of assembly can be easily performed by engaging a hook portion (not shown) on the lid 203 with the engaging portion 255. As described above, the assembling is completed.

The present embodiment described above provides the same effect as that described about the first embodiment. Furthermore, the middle portion of the press-fit terminal 10A can be inserted into and held by the terminal holding portion 240 of the housing 202A. Thus, even when the total length of the press-fit terminal 10A is long, the middle portion can be secured to be held on the housing 202A, so that bending and inclining of the press-fit terminal 10A can be prevented and the connection of the coil assembly 1A to the control board 201A can be surely performed.

Furthermore, even if there is a certain extent of the distance spaced between the control board 201A and the coil assembly 1A, the connection of the coil assembly 1A to the control board 201A can be secured, so that the degree of freedom in the layout of the coil assembly 1A in the housing 202A is increased.

In addition, a wide portion 18 wider than the other portions is formed in the middle portion of the press-fit terminal 10A. Therefore, the middle portion of the press-fit terminal 10A can be surely held on the inner surface of the insertion hole 242 of the press-fit terminal 10A via the wide portion 18. This can more effectively prevent the press-fit terminal 10A from bending or falling.

As mentioned above, although the present invention is described based on the embodiments, the present invention is not limited to the configuration described in the embodiments, but the configuration can be appropriately changed in the scope without departing from the spirit thereof. Moreover, it is possible to add, delete, and replace a part of the configuration of the embodiments.

For example, although the ribs 25 are shown as having a rectangular parallelepiped shape, it is not limited thereto, and various shapes can be adopted. Further, the number of the ribs 25 installed may be single or three or more.

In addition, although the ribs 25 are provided on the coil assembly 1 (1A) and the groove portion 226 is provided on the housing 202 (202A), on the contrary, the groove portion may be provided on the coil assembly 1 (1A) and the ribs may be provided on housing 202 (202A).

Further, although the press-fit terminal 10 (10A) is used as a connection terminal, any other terminal which can be pressure-connected, such as a snap fit terminal, may be employed as a connection terminal.

Furthermore, the press-fit terminal 10 may be any terminal in which the terminal portion 12 protrudes upward from the bobbin 2, and the connection portion 13 or the like of the press-fit terminal 10 may be disposed on a side or the like of the bobbin 2.

Moreover, although the press-fit terminal 10 is described as insertion-molded in the bobbin 2, the press-fit terminal 10 is not limited thereto and may be attached to the bobbin 2 later.

Moreover, although the present invention discloses the coil assembly 1 (1A) as an electric component, the present invention may be also suitably applied on other electric components fitted in the housing 202 (202A).

Moreover, the adhesive is applied to the front surface 101 (101A) of the base body 100 (100A), but may be applied first to a side of the housing 202 (202A) and the coil assembly 1 (1A, electric component).

REFERENCE SIGNS LIST

1, 1A Coil assembly (electric component
2 Bobbin
3 York
25 Rib
50 Coil
51 Winding
10, 10A Press-fit terminal
200 Electronic control unit (Electric component assembly)
201 Control board (Board)
201a Through-hole
202, 202A Housing
V1, V2 Solenoid valve
U, U1 Vehicle brake fluid pressure control device

What is claimed is:

1. An electric component assembly, comprising:
   an electric component; and
   a housing with which the electric component is fitted, wherein the electric component and the housing are fixed to one surface of a base body, wherein
   the electric component includes a connection terminal press-fitted into a through-hole of a circuit board provided in the housing and an insertion direction of the connection terminal into the through-hole is a fitting direction with the housing;
   the electric component assembly includes a rib which is protrudingly provided on one of an outer surface of the electric component intersecting the fitting direction and an inner surface of the housing facing the outer surface, and a groove portion which is provided as a recess on another one of the outer surface of the electric component and the inner surface of the housing, wherein the rib is inserted into the groove portion by press-fitting; and
   an inner surface of the groove portion is provided with a protrusion that abuts onto the rib with an interference fit, whereby movement of the electronic component, in a direction other than the fitting direction or in a direction opposite the fitting direction, is substantially prevented.

2. The electric component assembly according to claim 1, wherein the protrusion protrudes from the inner surface of the groove portion and extends in a direction parallel to the fitting direction.

3. The electric component assembly according to claim 2, wherein the groove portion has an open end facing toward the electric component for receiving the rib during assembly, and has a closed end opposite the open end, the closed end limiting an extent to which the rib can be inserted into the groove portion.

4. The electric component assembly according to claim 3, wherein the electric component is a coil assembly for driving a solenoid valve, the coil assembly comprising:
   a bobbin;
   a coil including a winding around the bobbin;
   a yoke attached to the bobbin; and
   the connection terminal electrically connected to the winding.

5. A vehicle brake fluid pressure control device comprising the electric component assembly according to claim 4, the vehicle brake fluid pressure control device being connected between a master cylinder and a wheel brake, and controlling a brake fluid pressure acting on the wheel brake,
   wherein the solenoid valve is attached to the base body and the coil assembly is mounted on the solenoid valve.

6. The electric component assembly according to claim 2, wherein the electric component is a coil assembly for driving a solenoid valve, the coil assembly comprising:
   a bobbin;
   a coil including a winding around the bobbin;
   a yoke attached to the bobbin; and
   the connection terminal electrically connected to the winding.

7. A vehicle brake fluid pressure control device comprising the electric component assembly according to claim 6, the vehicle brake fluid pressure control device being connected between a master cylinder and a wheel brake, and controlling a brake fluid pressure acting on the wheel brake,
   wherein the solenoid valve is attached to the base body and the coil assembly is mounted on the solenoid valve.

8. The electric component assembly according to claim 1, wherein
   the electric component is a coil assembly for driving a solenoid valve, the coil assembly comprising:
   a bobbin;
   a coil including a winding around the bobbin;
   a yoke attached to the bobbin; and
   the connection terminal electrically connected to the winding.

9. A vehicle brake fluid pressure control device comprising the electric component assembly according to claim 8, the vehicle brake fluid pressure control device being connected between a master cylinder and a wheel brake, and controlling a brake fluid pressure acting on the wheel brake, wherein
   the solenoid valve is attached to the base body and the coil assembly is mounted on the solenoid valve.

10. The electric component assembly according to claim 8, wherein the electric component has an open space formed therein between an end portion of said solenoid valve and said circuit board.

11. An electric component assembly comprising:
    a coil assembly and a solenoid valve slidably disposed in the coil assembly; and
    a housing with which the coil assembly is fitted, wherein:
    the coil assembly and the housing are fixed to one surface of a base body,
    the coil assembly includes a connection terminal press-fitted into a through-hole of a circuit board provided in the housing, the connection terminal configured to releasably connect the electric component and the circuit board together via press-fitting, wherein an insertion direction of the connection terminal into the through-hole is a fitting direction with the housing;
    the coil assembly includes a pair of ribs which are protrudingly provided on opposite outer surfaces thereof, the coil assembly intersecting the fitting direction and an inner surface of the housing, and the housing comprises a pair of groove portions which are provided as recesses on the inner surface thereof, wherein the ribs are inserted into the groove portions by press-fitting;

and wherein an inner surface of each of the groove portions is provided with a protrusion that abuts onto a corresponding one of the ribs with an interference fit, whereby movement of the coil assembly in a direction other than the fitting direction, or in a direction opposite the fitting direction, is substantially prevented.

12. The electric component assembly according to claim 11, wherein each of the protrusions extends in a direction parallel to the fitting direction.

13. The electric component assembly according to claim 11, wherein the groove portions have open ends facing toward the electric component for receiving the ribs during assembly, and have closed ends opposite the open ends, the closed ends limiting an extent to which the ribs can be inserted into the grooves.

14. The electric component assembly according to claim 11, wherein the coil assembly comprises:
a bobbin;
a coil including a winding around the bobbin;
a yoke attached to the bobbin; and
the connection terminal electrically connected to the winding.

15. An electric component assembly comprising:
an electric component, and
a housing with which the electric component is fitted, wherein the electric component and the housing are fixed to one surface of a base body, wherein:
the electric component includes a connection terminal press-fitted into a through-hole of a circuit board provided in the housing, the connection terminal configured to releasably connect the electric component and the circuit board together via press-fitting, wherein an insertion direction of the connection terminal into the through-hole is a fitting direction with the housing;
the electric component includes a pair of ribs which are protrudingly provided on opposite outer surfaces thereof, the electric component intersecting the fitting direction and an inner surface of the housing,
and the housing has a pair of groove portions formed therein which are provided as recesses on the inner surface thereof, the groove portions having open ends facing toward the electric component for receiving the ribs during assembly, and having closed ends opposite the open ends, the closed ends limiting an extent to which the ribs can be inserted into the grooves, wherein the ribs are inserted into the groove portions by press-fitting;
and wherein an inner surface of each of the groove portions is provided with a protrusion that abuts onto a corresponding one of the ribs.

16. The electric component assembly according to claim 15, wherein each of the protrusions extends in a direction parallel to the fitting direction.

17. The electric component assembly according to claim 15, wherein the electric component assembly comprises:
a bobbin;
a coil including a winding around the bobbin;
a yoke attached to the bobbin; and
the connection terminal electrically connected to the winding.

* * * * *